United States Patent
Peng

(10) Patent No.: US 6,928,467 B2
(45) Date of Patent: Aug. 9, 2005

(54) APPARATUS AND METHODS FOR PROVIDING DATA SYNCHRONIZATION BY FACILITATING DATA SYNCHRONIZATION SYSTEM DESIGN

(75) Inventor: Luosheng Peng, San Jose, CA (US)

(73) Assignee: Inno Path Software, Inc., Alviso, CA (US)

( * ) Notice: Subject to any disclaimer, the term of this patent is extended or adjusted under 35 U.S.C. 154(b) by 806 days.

(21) Appl. No.: 09/776,598

(22) Filed: Feb. 1, 2001

(65) Prior Publication Data

US 2001/0048728 A1 Dec. 6, 2001

Related U.S. Application Data

(60) Provisional application No. 60/179,761, filed on Feb. 2, 2000.

(51) Int. Cl.[7] .............................................. G06F 13/00
(52) U.S. Cl. ...................... 709/219; 709/203; 707/104; 719/319; 719/329
(58) Field of Search ................................. 709/203, 219, 709/213, 217, 248; 707/104, 10, 203; 719/319, 329

(56) References Cited

U.S. PATENT DOCUMENTS

| 5,491,800 | A | 2/1996 | Goldsmith et al. |
| 5,613,108 | A | 3/1997 | Morikawa |
| 5,632,018 | A | 5/1997 | Otorii |
| 5,771,355 | A | 6/1998 | Kuzma |
| 5,815,663 | A | 9/1998 | Uomini |
| 5,835,727 | A | 11/1998 | Wong et al. |
| 5,835,911 | A | 11/1998 | Nakagawa et al. |
| 5,887,254 | A | 3/1999 | Halonen |
| 5,903,723 | A | 5/1999 | Beck et al. |
| 5,926,624 | A | 7/1999 | Katz et al. |
| 5,999,932 | A | 12/1999 | Paul |
| 6,105,063 | A | 8/2000 | Hayes, Jr. |
| 6,169,909 | B1 | 1/2001 | Koshino |
| 6,170,060 | B1 | 1/2001 | Mott et al. |
| 6,182,117 | B1 * | 1/2001 | Christie et al. ............. 709/205 |
| 6,199,076 | B1 | 3/2001 | Logan et al. |
| 6,263,347 | B1 * | 7/2001 | Kobayashi et al. ......... 707/201 |
| 6,339,787 | B1 * | 1/2002 | Yohe et al. ................. 709/217 |
| 6,412,017 | B1 * | 6/2002 | Straube et al. .............. 719/313 |
| 6,430,576 | B1 * | 8/2002 | Gates et al. ................ 707/201 |
| 6,477,543 | B1 * | 11/2002 | Huang et al. ............... 707/200 |

OTHER PUBLICATIONS

U.S. Appl. No. 09/776,165, filed Feb. 1, 2001; "Apparatus and Methods For Optimizing Traffic Volume in Wireless Email Communications"; Inventor: Luosheng Peng.
U.S. Appl. No. 09/776,593, filed Feb. 1, 2001; "Apparatus and Methods For Providing Personalized Application Search Results for Wireless Devices Based on User Profiles"; Inventor Luosheng Peng.
U.S. Appl. No. 09/776,594, filed Feb. 1, 2001; "Apparatus and Methods For Providing Coordinated and Personalized Application and Data Management for Resource-Limited Mobile Devices"; Inventor: Luosheng Peng.

* cited by examiner

Primary Examiner—Viet D. Vu
(74) Attorney, Agent, or Firm—Patentesque Law Group, LLP; Roxanna H. Yang

(57) ABSTRACT

Object stores are used as building blocks to construct a system with variable complexity on a network. Typically, an object store comprises information (e.g., data) stored in object format, or objects. The objects and object stores are managed by an object version management mechanism that adapts to different object store types and optimizes resource consumption by each object store. Various data fields are used to indicate an object's version within an object store. Version information is used to compare the states among matching object replicas in matching object stores. Utilizing both the object store based system and the object version management mechanism, a data synchronization protocol is developed. The data synchronization protocol is capable of adapting to different types of object stores and the characteristics of network connection media to optimize data synchronization.

8 Claims, 20 Drawing Sheets

APPARATUS AND METHODS FOR PROVIDING DATA SYNCHRONIZATION BY FACILITATING DATA SYNCHRONIZATION SYSTEM DESIGN

RELATED APPLICATIONS

This application claims priority to the provisional application entitled "Data Synchronization System Modeling and Optimization for Support of Disconnected Operation and High Data Availability," filed on Feb. 2, 2000, bearing the ser. No. 60/179,761.

This application is also related to applications entitled "Apparatus and Methods for Optimizing Traffic Volume in Wireless Email Communications," "Apparatus And Methods For Providing Coordinated And Personalized Application And Data Management For Resource-limited Mobile Devices," and "Apparatus and Methods for Providing Personalized Application Search Results for Wireless Devices Based on User Profiles," bearing Ser. Nos. 09/776,165, 09/776,594, and 09/776,593, respectively. These applications were filed on Feb. 1, 2001 and all claimed priority to the above provisional application bearing Ser. No. 60/179,761.

FIELD OF THE INVENTION

This invention relates to apparatus and methods for providing data synchronization. In particular, this invention relates apparatus and methods for providing data synchronization on a mobile device system.

BACKGROUND OF THE INVENTION

Computer devices connected by a network are typically capable of sharing information. In a world wide network, such as the Internet, client computers or devices connected to the network are capable of accessing information stored in virtually any server computers connected to the network. Similarly, in a private network, such as an intranet, a computer connected to the network is typically capable of accessing information stored in other computers also connected to the network. Typically, fast access to data requires that the data be stored locally in a storage medium. For example, data can be stored in a hard drive, a computer disk, an IC/smart card, a re-writeable ROM, or a non-volatile RAM. Different data formats and management schemes may be employed by each of the storage media described above. For example, a database system, such as the Oracle 8 database system by Oracle, may be used to store data in relational tables or object tables.

As more resources are invested to construct mission-critical applications and services using theses networks, many enterprises can no longer risk possible failure that may occur in their networks. One way to protect losses resulting from network failure is to use redundant servers. Connection paths from end devices to the redundant servers are established to improve data availability. To be effective, however, the redundant servers require efficient data synchronization and data consistency maintenance to ensure data integrity and data availability. Further, an efficient data synchronization process has to be compatible across all platforms, operating systems, data formats, application supporting tools, and networks.

Thus, it is desirable to provide apparatus and methods for providing data synchronization in mobile device systems that overcome the above problems.

SUMMARY OF THE INVENTION

Object stores are used as building blocks to construct a system with variable complexity on a network. An object store is a software mechanism that is used to control data replication, synchronization, and maintain data persistence/consistency on a device. Typically, an object store comprises information (e.g., data) stored in object format, or objects. These objects can be replicated, compared, and updated quickly among different locations in the network. The objects and object stores are managed by an object version management mechanism that adapts to different object store types and optimizes resource consumption by each object store. In an exemplary embodiment, data fields, such as dirty bits, update sequence numbers, and/or version vectors, are used to indicate an object's version within an object store. Further, such version information is used to compare the states among matching object replicas in matching object stores. Utilizing both the object store based system and the object version management mechanism, a data synchronization protocol is developed. The data synchronization protocol is capable of adapting to different types of object stores and the characteristics of network connection media to optimize data synchronization. In an exemplary embodiment, the data synchronization protocol can be set on top of the HTTP, SMTP, TCP/IP, or other Internet protocols in a protocol stack and can support both synchronous and asynchronous modes of synchronization.

System structures that benefit from this invention include: primitive systems (i.e., one-to-one systems, client-server systems, and peer-to-peer systems) and multi-tier hierarchical systems/star-structured systems (i.e., systems that comprise of a combination of one or more of the primitive systems).

DETAILED DESCRIPTION OF THE INVENTION

Figure 1:
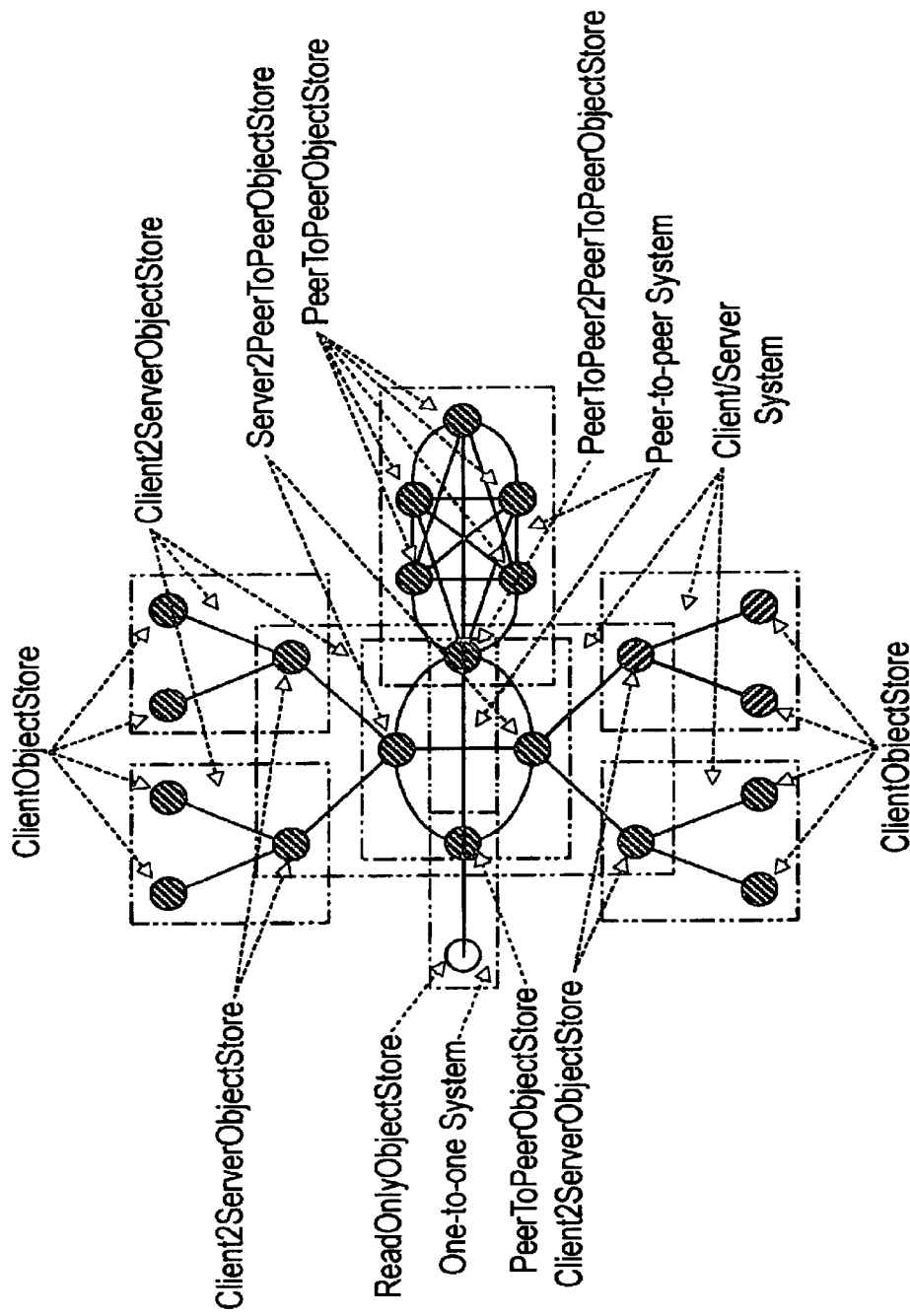
FIG. 1 schematically illustrates an exemplary network in accordance with an embodiment of the invention.

In general, there are three types of relational systems (or primitive systems) between devices, namely, the one-to-one system, the client-server system, and the peer-to-peer system. In a typical network, one or more of the primitive systems are involved. FIG. 1 illustrates an exemplary network comprising of primitive systems interconnected to each other. Achieving data synchronization in such a network usually involves two types of object stores: basic object stores and joint object stores. An object store comprises data represented as objects that are accessible by applications. A basic object store belongs to one primitive system or is for read-only purpose. A joint object store belongs to multiple primitive systems and links those primitive systems.

Exemplary basic object stores include one-to-one object stores (each object store belongs to a one-to-one system and synchronizes with only one remote object store), client object stores (each object store belongs to a client-server system and synchronizes with only one remote object store serving as the server), server object stores (each object store belongs to a client-server system and synchronizes with all remote object stores acting as its client), peer-to-peer object stores (each object store belongs to a peer-to-peer system and synchronizes with all remote object stores acting as its peers), and read-only object stores (each object store allows applications to read objects and retrieves updates from one or more remote object stores).

Exemplary joint object stores include one-to-one to one-to-one object stores (each object store belongs to and joins two one-to-one systems), one-to-one to client object stores (each object store belongs to and joins a one-to-one system and a client-server system as a client in the client-server system), one-to-one to peer-to-peer object stores (each object store belongs to and joins a one-to-one system and a peer-to-peer system), client to client object stores (each object store belongs to and joins two client-server system as the client in both systems), client to server object stores (each object store belongs to and joins two client-server systems as a client in one system and a server in the other system), client to peer-to-peer object stores (each object store belongs to and joins a client-server system and a peer-to-peer system as a client at the client-server system), server to peer-to-peer object stores (each object store belongs to and joins a client-server system and a peer-to-peer system as a server in the client-server system), peer-to-peer to peer-to-peer object stores (each object store belongs to and joins two peer-to-peer systems), and generic joint object stores (each object store belongs to and links three or more primitive systems).

Figure 2:
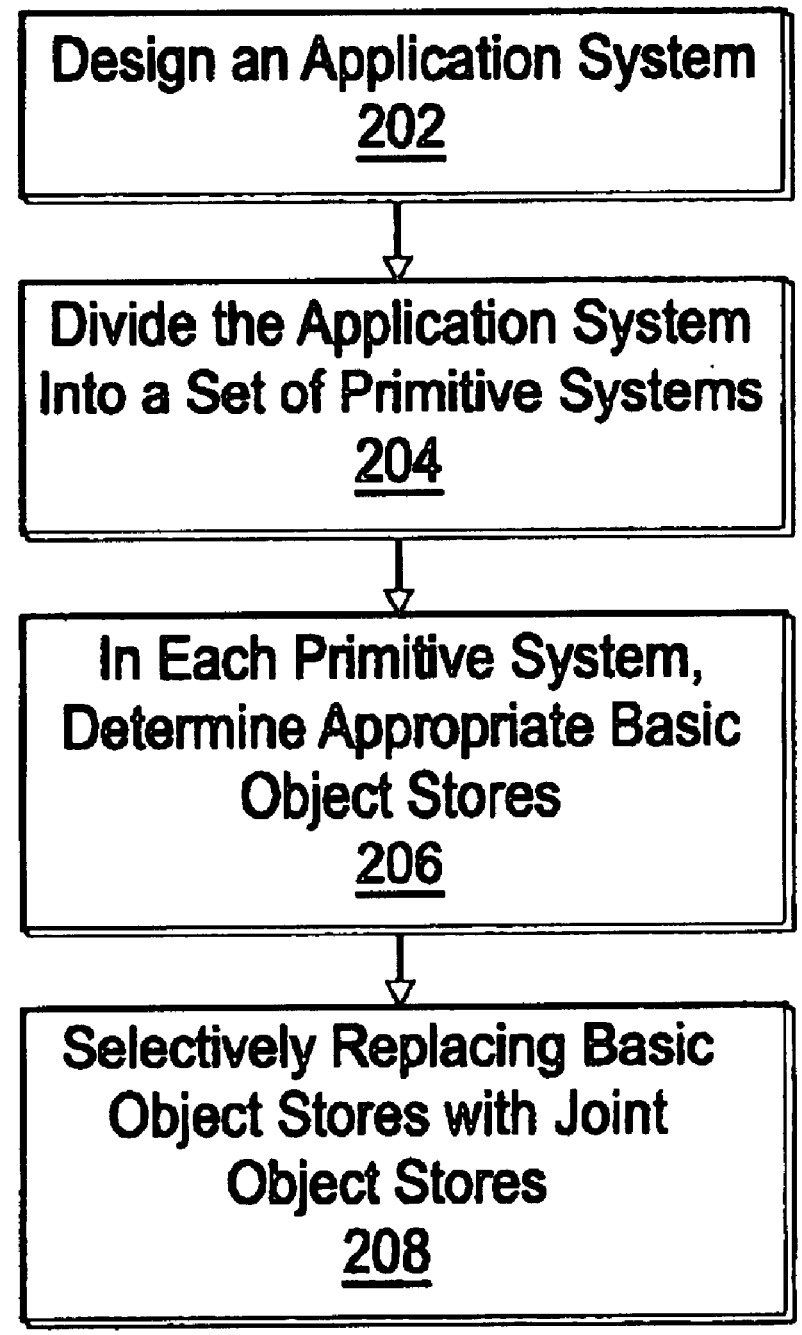
FIG. 2 schematically illustrates an exemplary joint object store in accordance with an embodiment of the invention.

FIG. 2 illustrates an exemplary process for determining the appropriate object store types in an application system in accordance with an embodiment of the invention. At step 202, an application system comprising a network of devices is designed. Next, the application system is functionally divided into a set of primitive systems (step 204). In each primitive system, appropriate basic object stores are determined in accordance with their roles in the primitive system (e.g., client, server, peer, etc.) (step 206). Next, for object stores that belong to multiple primitive systems, an appropriate joint object store type replaces the basic object store type (step 208).

Generally, each object store has a unique name that is used for identification. Objects in an object store typically form a hierarchy. In one embodiment, at the root of the hierarchy is an object that declares three basic synchronization methods: setTo, reconcile, and reconcileWithDelete methods. These methods are called in turn during a data synchronization process. In an exemplary embodiment, the setTo method is called on a local object when a remote replica object of the local object is located and the remote replica object is more recently updated than the local object. The reconcile method is called on a local object when the remote replica object has an update conflict with data in the local object. The reconcileWithDelete method is called on a local object when the local object is updated and the remote replica object is deleted. In one embodiment, the reconcileWithDelete method is called on a replica object when the replica object is updated and the local object is deleted.

In an exemplary embodiment, an object store allows applications to insert, update, delete, or retrieve its objects among a set of distributed devices at the same time. In one embodiment, an object store also provides standard interfaces for transaction processing, remote replica registration, data synchronization, and storage media flush. Each device may have a replica of multiple object stores. Due to the possible number of data formats and management schemes among database systems, an interface between the database system and the object stores is used to map data between systems. In an exemplary embodiment, the interface may also support referential integrity, multi-thread transaction processing, and data locking.

In an exemplary embodiment, an object store is opened in one of two modes: shared access or exclusive access. In the shared access mode, multiple applications can open the same object store at the same time. In one embodiment, when multiple applications open an object store at the same time, each application is provided a unique handle. All handles of the same object store share the same set of objects located in the same memory space. In the exclusive access mode, as the name suggests, only one application can open an object store at a time; other applications attempting to open the same object store need to wait until the first application exits the object store before access is granted in sequence.

If a device is opening an object store for the first time, an empty object store is created and saved to the storage medium on the device. An empty object store is populated by different ways. In one embodiment, a local application on the device accessing the object store generates new objects and inserts them into the empty object store. In another embodiment, a subset or all of the objects in a corresponding object store on a remote device is replicated and placed into the empty object store.

A sync version is a meta object that is used to characterize an object's state relative to all other replica objects in a system. An object store and objects in the object store can both be associated to each other with one or more sync versions. Sync versions are created, updated, or deleted by object stores and such processes are transparent to the applications accessing the object stores. A sync version associated with an object indicates the object's state relative to replicas of the same object in a system. A sync version associated with an object store indicates the collective state of all the objects in the object store relative to all replicas of the object store in a system.

In an exemplary embodiment, a sync version can be implemented in one of three ways: dirty bit, update sequence number, and version vector. A dirty bit is a single bit that indicates whether an associated object is in a different state than the object's replica at another object store. When a dirty bit is set on, its associated object is assumed to be different than the object's remote replica. When a dirty bit is set off, its associated object is assumed to be the same as the object's remote replica. In an exemplary embodiment, a dirty bit is used only for object stores that synchronize with at most one remote object store replica.

An update sequence number is an integer that increments with time. Typically, update sequence numbers are generated by a central server and distributed to the central server's clients. An update sequence number associated with an object is used to compare an object replica to the object and to other replicas to determine the age of the object replica relative to the object and to the other replicas.

A version vector is a vector of a pair of indicators: replica-ID and time stamp. The replica-ID identifies an object store replica in a system. The time stamp is typically generated by an object store replica to indicate the last known time (not necessarily the actual last time) that the object store replica has updated at least one of its objects. A version vector is a variable length vector. Each version vector includes indicator pairs that correspond to the object store replicas that are known to have performed one update to at least one object associated with that object store replica. An exemplary management process for managing all objects of an object store is described below.

An object store typically has one or more remote object stores connected to it. To facilitate data synchronization between object stores, an object store creates and maintains an object store replica information object for each of its remote object stores. An object store replica information object that corresponds to a remote object store includes common fields, such as update data format(s) acceptable to the remote object store and a filter for determining the objects contained in the remote object store and non-common fields that are specific to each object store type. An object store is typically able to recognize and accept a set of update data formats. The types and names of the set of acceptable update data formats are generally predetermined and agreed upon among a set of object stores.

In a one-to-one object store, the sync version associated with each object in the object store is a dirty bit. Further, only one remote object store among the one-to-one object store, one-to-one to one-to-one object store, one-to-one to client object store, one-to-one to peer-to-peer object store, and generic joint object store can be registered as its replica. In a one-to-one object store, the store sync version (a dirty bit) is on if any of the sync versions (dirty bits) of the objects contained in the object store is on. The store sync version is off when the sync versions of all objects contained in the object store are off.

In a client object store, the sync version associated with each object in the object store is a combination of a dirty bit and an update sequence number. The update sequence number represents the version of an object when the client object store last synchronized with its server and the dirty bit indicates whether the object has been updated in the client object store since the last synchronization. Further, only one remote object store among the server object store, client to server object store, server to peer-to-peer object store, and generic joint object store can be registered as its replica. In a client object store, the dirty bit of the store version (a combination of dirty bit and update sequence number) is on if the sync version (a combination of dirty bit and update sequence number) of any of the objects contained in the object store is on. The dirty bit of the store sync version is off when the dirty bits of the sync versions of all objects contained in the object store are off. The update sequence number of the store version is equal to the greatest value of all the update sequence numbers of the sync versions of the objects contained in the object store.

In a server object store, the sync version associated with each object in the object store is an update sequence number. Further, a set of remote object stores among the client object store, one-to-one to client object store, client to client object store, client to server object store, client to peer-to-peer object store, and generic joint object store can be registered as its replicas. In a server object store, the store sync version (an update sequence number) is equal to the greatest value of all the sync versions (update sequence numbers) of the objects contained in the object store.

In a peer-to-peer object store, the sync version associated with each object in the object store is a version vector. Further, any unlimited number of remote object stores among the peer-to-peer object store, one-to-one to peer-to-peer object store, client to peer-to-peer object store, server to peer-to-peer object store, peer-to-peer to peer-to-peer to object store, and generic joint object store can be registered as its replicas. In a peer-to-peer object store, the store sync version (a version vector) is equal to the upper bound of all the sync versions (version vectors) of the objects contained in the object store.

In a read only object store, the sync version associated with each object in the object store is of a dynamic type depending on the remote replica(s) from which it receives updates. One or more remote object stores of any type can be registered as its replica(s).

In a one-to-one to one-to-one object store, two sync versions of dirty bits are associated to each object in the object store. Among the two sync versions associated with each object, one is used to synchronize with its replica in a first one-to-one system and the other is used to synchronize with its replica in a second one-to-one systems. Two remote object stores among the one-to-one object store, one-to-one to one-to-one object store, one-to-one to client object store, one-to-one to peer-to-peer object store, and generic joint object store can be registered as its replicas.

In a one-to-one to client object store, two sync versions are associated with each object in the object store. These two sync versions comprise a dirty bit and a combination of a dirty bit and an update sequence number. The first dirty bit indicates synchronization with the object's replica in a one-to-one system. The combination of a dirty bit and an update sequence number indicates synchronization with the object's server replica in a client-server system. A remote object store among the one-to-one object store, one-to-one to one-to-one object store, one-to-one to client object store, one-to-one to peer-to-peer object store, or generic joint object store and a remote object store among the server object store, client to server object store, server to peer-to-peer object store, and generic joint object store can be registered as its replicas.

In a one-to-one to peer-to-peer object store, two sync versions are associated with each object in the object store. These two sync versions comprise a dirty bit and a version vector. The dirty bit indicates synchronization with an object's replica in a one-to-one system. The version vector indicates synchronization with the object's replicas in a peer-to-peer system. A remote object store among the one-to-one object store, one-to-one to one-to-one object store, one-to-one to client object store, one-to-one to peer-to-peer object store, or generic joint object store and a set of remote object stores among the peer-to-peer object store, one-to-one to peer-to-peer object store, client to peer-to-peer object store, server to peer-to-peer object store, peer-to-peer to peer-to-peer object store, and generic joint object store can be registered as its replicas.

In a client to client object store, two sync versions are associated with each object in the object store. These two sync versions comprise two combinations of a dirty bit and an update sequence number. The first sync version indicates synchronization with the object's server replica in a first client-server system and the second sync version indicates synchronization with the object's server replica in a second client-server system. Two remote object stores among the server object store, client to server object store, server to peer-to-peer object store, and generic joint object store can be registered as its replicas.

In a client to server object store, two sync versions are associated with each object in the object store. These two sync versions comprise an update sequence number and a combination of a dirty bit and another update sequence number. The combination of a dirty bit and an update sequence number indicates synchronization with an object's server replica in a client-server system. The other update sequence indicates synchronization with an object's client replicas in another client-number server system. A remote object store among the server object store, client to server object store, or generic joint object store and a set of object stores among the client object store, one-to-one to client object store, client to client object store, client to server object store, client to peer-to-peer object store, and generic joint object store can be registered as its replicas.

In a client to peer-to-peer object store, two sync versions are associated with each object in the object store. These two sync versions comprise a combination of a dirty bit and an update sequence number and a version vector. The combination of a dirty bit and an update sequence number indicates synchronization with an object's server replica in a client-server system. The version vector indicates synchronization with an object's replicas in a peer-to-peer system. A remote object store among the server object store, client to server object store, server to peer-to-peer object store, or generic joint object store and a set of object stores among the peer-to-peer object store, one-to-one to peer-to-peer object store, client to peer-to-peer object store, server to peer-to-peer object store, peer-to-peer to peer-to-peer object store, and generic joint object store can be registered as its replicas.

In a server to peer-to-peer object store, two sync versions are associated with each object in the object store. These two sync versions comprise an update sequence number and a version vector. The update sequence number indicates synchronization with an object's client replicas in a client-server system. The version vector indicates synchronization with an object's replicas in a peer-to-peer system. A set of remote object stores among the client object store, one-to-one to client object store, client to client object store, client to server object store, client to peer-to-peer object store, or generic joint object store and a set of object stores among the peer-to-peer object store, one-to-one to peer-to-peer object store, client to peer-to-peer object store, server to peer-to-peer object store, peer-to-peer to peer-to-peer object store, and generic joint object store can be registered as its replicas.

In a peer-to-peer to peer-to-peer object store, two sync versions are associated with each object in the object store. These two sync versions comprise two version vectors. A first version vector indicates synchronization with an object's replicas in a first peer-to-peer system and a second version vector indicates synchronization with the object's replicas in a second peer-to-peer system. A set of remote object stores among the peer-to-peer object store, one-to-one to peer-to-peer object store, client to peer-to-peer object store, server to peer-to-peer object store, peer-to-peer to peer-to-peer object store, and generic joint object store can be registered as its replicas.

In a generic joint object store, three or more sync versions are associated with each object in the object store. In an exemplary embodiment, each sync version indicates synchronization with an object's replicas in a primitive system and the type of such a sync version is dependent on the type of primitive system and the role of the generic joint object store in the primitive system. A set of object store in accordance with the primitive systems linked by the generic joint object store can be registered as its replicas.

Figure 3:
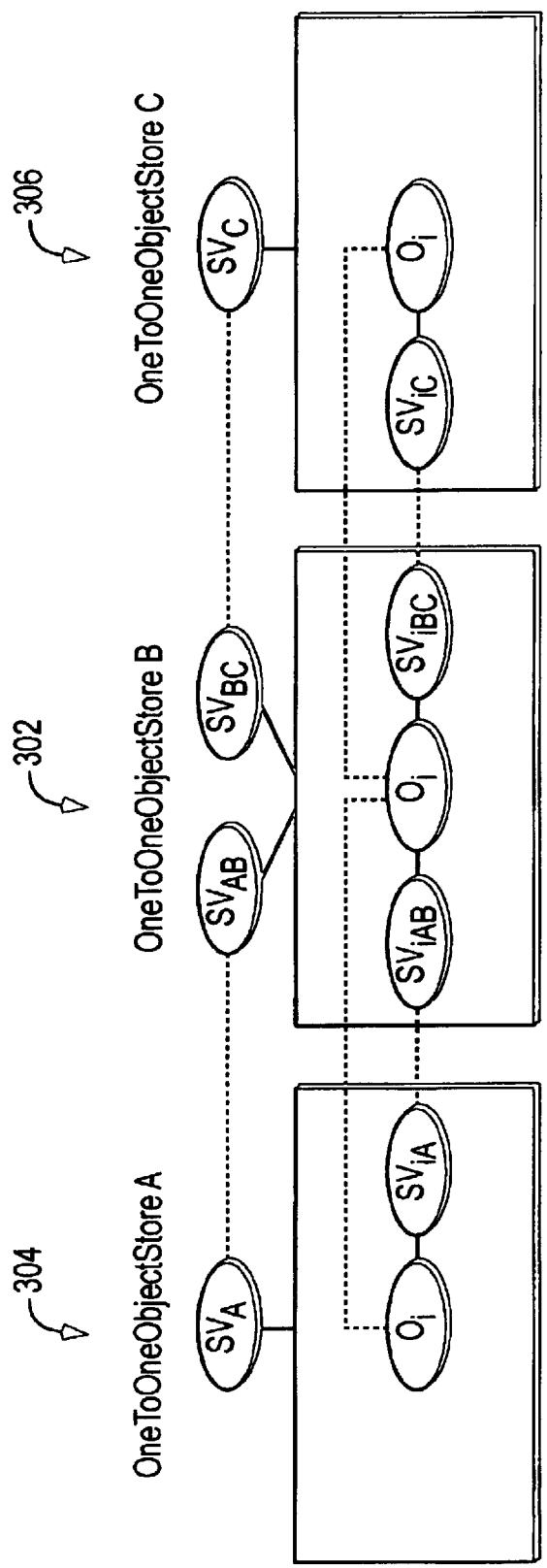
FIG. 3 illustrates an exemplary process in accordance with an embodiment of the invention.

FIG. 3 illustrates an exemplary one-to-one to one-to-one object store B 302 that joins a one-to-one object store A 304 and a one-to-one object store C 306. In FIG. 3, assume initially all objects of the three object stores 302, 304, and 306 are consistent at time $t_0$; thus, the dirty bit(s) associated with the objects and object stores are set off. In addition, assume $t_i$ (i=0, 1, 2, ..., n) represents a point in time and $t_0 < t_1 < t_2 < ... < t_n$. When an object $O_i$ in the object store A 304 is updated at time $t_1$, the dirty bit $SV_{iA}$ that is associated with $O_i$ and the dirty bit $SV_A$ that is associated with the object store A 304 are set on. Next, the object store A 304 initiates a data synchronization process with the joint object store B 302 at time $t_2$ by sending a synchronization request to the joint object store B 302. When the joint object store B 302 receives the synchronization request from the object store A 304, it prepares to receive updates from the object store A 304 by selecting the set of dirty bits $SV_{iAB}$ and $SV_{AB}$ for the synchronization. Next the object store A 304 sends the object $O_i$ to the joint object store B 302. After the synchronization process is completed (e.g., at time $t_3$), the dirty bit $SV_{iA}$ and $SV_A$ are set off while the dirty bits $SV_{iBC}$ and $SV_{BC}$ are set on to reflect the update of object $O_i$ at the joint object store B 302.

At time $t_4$, the object $O_i$ in object store C 30 is updated. Accordingly, the dirty bit $SV_{iC}$ that is associated with the object $O_i$ in the object store C 306 and the dirty bit $SV_C$ that is associated with the object store C 306 are set on. Next, at time $t_5$, the object store C 306 initiates a data synchronization process with the joint object store B 302 by sending a synchronization request to the joint object store B 302. After receiving the synchronization request, the joint object store B 302 prepares for the synchronization by selecting the set of dirty bits $SV_{iBC}$ and $SV_{BC}$ for the synchronization. The object store C 306 then sends the object $O_i$ to the joint object store B 302 and after the joint object store B 302 receives the object $O_i$ from the object store C 306, the dirty bits $SV_{iC}$ and $SV_C$ at the object store C 306 are set off.

A concurrent update conflict regarding object $O_i$ is detected at the joint object store B 302 and the conflict is resolved by merging the conflicting updates. As a result of the merge, the contents of the object $O_i$ in the joint object store B 302 may be different than the object $O_i$ at the object store A 304 and the object store C 306. If that is the case, the dirty bits $SV_{iBC}$ and $SV_{BC}$ should remain on and the dirty bits $SV_{iAB}$ and $SV_{AB}$ are set on. Next, the joint object store B 302 sends its version of object $O_i$ to the object store C 306 for synchronization. After the synchronization is completed (e.g., at time $t_6$), the dirty bits $SB_{iBC}$ and $SB_{BC}$ are set off. Finally, the joint object store B 302 initiates a data synchronization with the object store A 304 and sends its version of the object $O_i$, to the object store A 304. After the synchronization is completed, the dirty bits $SV_{iAB}$ and $SV_{AB}$ are set off. As a result, the object $O_i$ at all object stores 302, 304, and 306 are again consistent.

When designing a data synchronization protocol, various high level and low level issues should be considered. Exemplary high level issues include differential synchronization, fault tolerance, and subset filtering. Differential synchronization ensures that each object store only sends or receives updated objects to or from a replica when performing synchronization with the replica. Fault tolerance ensures that a failed synchronization process is restarted from the point of failure. Subset filtering allows efficient synchronization among object stores having different objects. For example, a subset of objects (i.e., ones that are relevant or irrelevant) is filtered at an object store before such synchronization occurs. In an exemplary embodiment, a subset filter is defined when an object store is created and then sent to that object store's replicas during the first synchronization process.

Exemplary low level issues include redundant update transmission, overhead reduction, and system/network adaptability. Redundant update transmission between object stores in a peer-to-peer system can be avoided by performing sync version comparisons at a destination object store. New transmission of objects already received at the destination object store is ignored. A user at a source object store may also obtain an exclusive access to a destination object store (or a subset of the objects in the destination object store) during a synchronization process to prevent redundant update transmissions from other object stores.

To reduce overhead, the sync versions of a source object store and a destination object store should be compared at the beginning of a synchronization process, such that if the source object store has an older (less recently updated) or equal sync version than the destination object store, the synchronization process is aborted. In addition, when the source object store and the destination object store are both compatible with certain data compression methods, such data compression methods should be employed, whenever possible during synchronization, to improve data traffic and reduce overhead.

Finally, system/network adaptability deals with determining packet sizes and flow control based on the underlying system or network capabilities to avoid data loss and achieve higher efficiency. For example, in a high speed network, larger packet size and faster data flow can be processed. In one embodiment, flow control is adaptively optimized based on system/network topology; that is, optimized based on the types of object stores involved in each synchronization process.

Generally, data synchronization protocol in accordance with the invention is configurable to run on TCP/IP, HTTP, or SMTP protocols. When the data synchronization protocol is run on the HTTP or SMTP protocols, objects and meta objects (i.e., sync version and object identification) are embedded serially in HTTP or SMTP format, respectively. Otherwise, in an exemplary embodiment, the data synchronization protocol is configured to run on the TCP/IP protocol by default.

Figure 4:
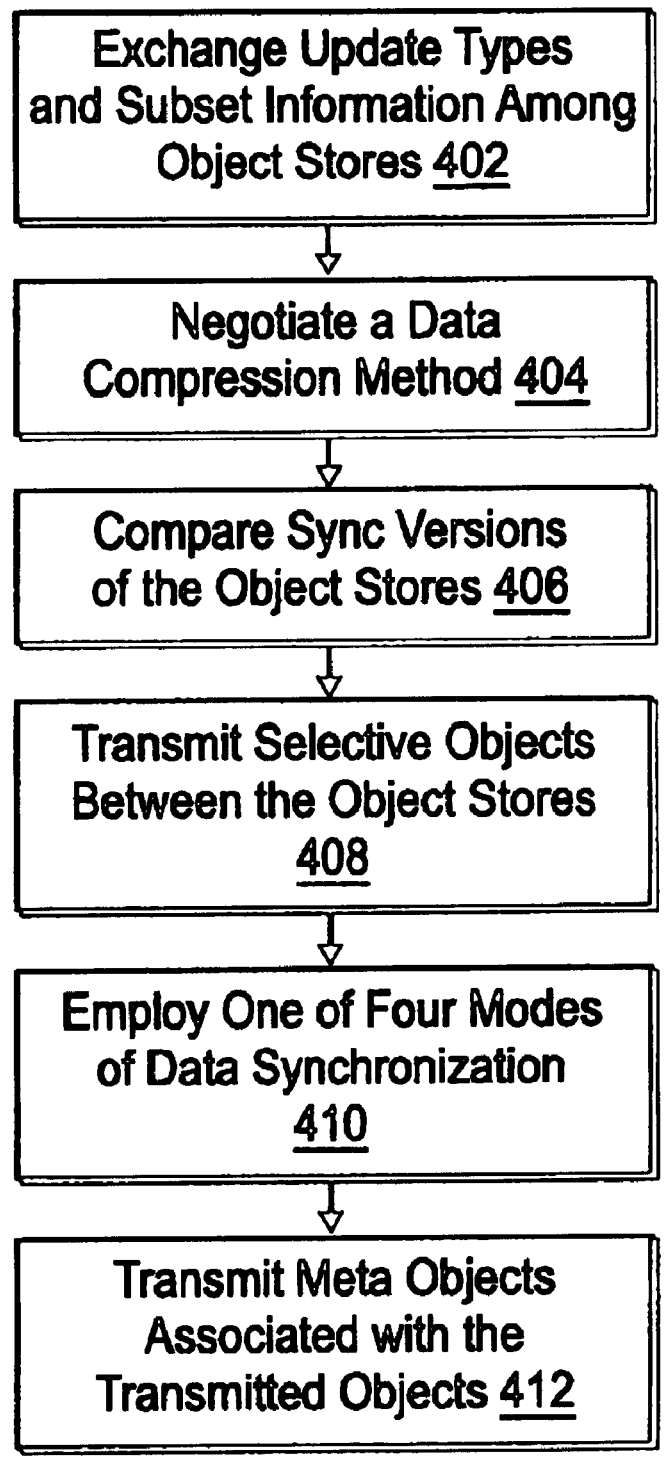
FIG. 4 illustrates another exemplary process in accordance with an embodiment of the invention.

FIG. 4 illustrates an exemplary data synchronization protocol (DSP) in accordance with an embodiment of the invention. At step 402, exchange update types and subset definitions among object stores to commence a synchronization process. Next, the object stores negotiate and agree upon a data compression method (step 404). The sync versions of the object stores are compared (step 406). Objects representing the difference between the object stores are transmitted between the object stores (step 408). In an exemplary embodiment, one of four modes of data synchronization is used (step 410). These four modes are: push-only, pull-only, push-then-pull, and pull-then-push. The push-only mode is the synchronization process that sends updates only from the source object store to the destination object store. The pull-only mode is the data synchronization process that sends updates from the destination object store to the source object store. The push-then-pull mode is the data synchronization process that first sends updates from the source object store to the destination object store, then sends updates from the destination object store to the source object store. The pull-then-push mode is the data synchronization process that is the reverse of the push-then-pull mode. Next, meta objects (i.e., sync versions and object identifications) associated with the transmitted objects are also transmitted between the object stores (step 412).

In an exemplary embodiment, there are two types of messages being transmitted in a data synchronization protocol (DSP) process: DSP URLs and DSP sync messages. A DSP URL uniquely identifies an object store and may be used to establish connection between a source object store and a destination object store. An exemplary DSP URL is as follows:

url:dsp:[(http smtp):]//host-name[:port-no]/objectstore-name;DEVICEID=device-id&[&CREATE] [&EXCLUSIVE-[&NOWAIT]][&option-extensions]

In the exemplary DSP URL, strings in italics represent variable parameters. The "|" denotes a selection, the brackets enclose an option, and the parentheses enclose a set of selection list. If "http" or "smtp" is specified, the DSP will run on HTTP or SMTP; otherwise, the DSP will run on TCP/IP by default. The "objectstore-name" indicates the name of an object store for which this URL is specified ("the object store"). The "device-id" indicates the unique identification of the device where the object store resides. The "CREATE" parameter indicates that a new object store will be created on a remote device. The "EXCLUSIVE" parameter indicates that a destination object store is opened for exclusive access during synchronization with the object store; a synchronization process will block until a destination object store can be opened for exclusive access. If a "NOWAIT" parameter is used in addition to the "EXCLUSIVE" parameter, a synchronization process will automatically fail if a destination object store is already opened by another.

A DSP sync message is a data unit that is transmitted between object stores. Generally, there are two types of DSP sync messages: a request message and a response message. Exemplary fields included in a sync message are listed in Appendix A.

Figure 5:
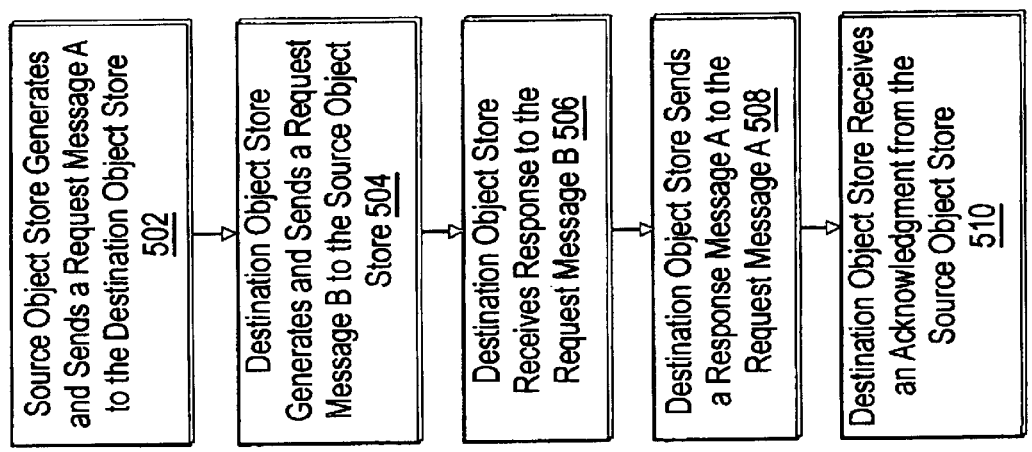
FIG. 5 illustrates another exemplary process in accordance with an embodiment of the invention.

An exemplary sync message flow is illustrated in FIG. 5. A source object store generates and sends a request message A to a destination object store (step 502). Before sending a response message A to the request message A, the destination object store may generate and send a (or more) request message B to the source object store requesting user authentication or other information (step 504). Next, the destination object store receives a response to the request (step 506). When the destination object store eventually sends a response message A to the request message A, it may include a request to the source object store to send back a response indicating an acknowledgment of receipt (step 508). The destination object store receives an acknowledgment from the source object store (step 510).

In an exemplary embodiment, the DSP is adaptive to different network connection media and different system topologies. Further, the DSP is optimized for different synchronization modes. Different network connection media typically have different data transfer speed (bandwidth), latency (statistical length of time for a round-trip data transfer), and reliability (probability of accidental data loss or disconnection). In order to maximize resource utilization on a network, the size of each data packet to be transferred and data flow control should be determined based on the individual characteristics of each network connection medium.

Figure 6:
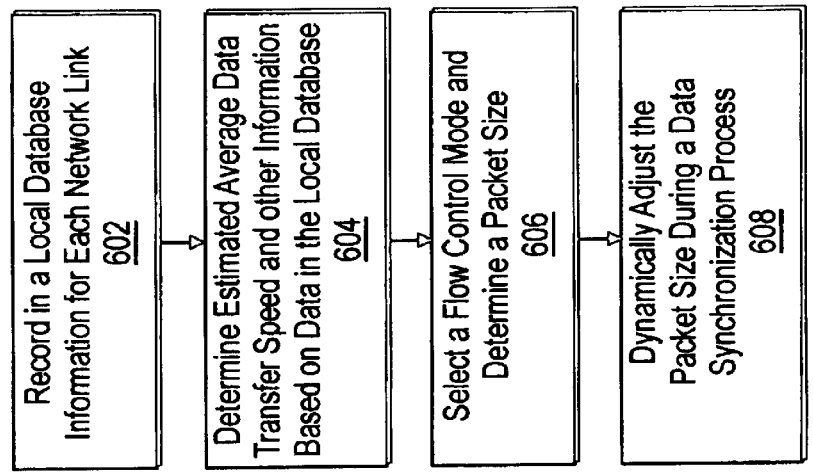
FIG. 6 illustrates another exemplary process in accordance with an embodiment of the invention.

FIG. 6 illustrates an exemplary process for maximizing resource utilization in accordance with an embodiment of the invention. At step 602, for each available network link (e.g., ethernet, telephone line, and wireless) between a local device and a remote device, record in a local database the following information: average data transfer speed, round-trip transfer time, and size of data packets that were successfully transferred between the devices in past "n" synchronization processes, where "n" is determined based on the type of network connection medium. Next, for each new data synchronization process, use information stored in the local database to determine estimated average data transfer speed, round-trip transfer time, and data packet size based on recent data synchronization transactions (step 604). Such estimated parameters are used to select a flow control mode (i.e., interactive mode or messaging mode) and determine a packet size for the new data synchronization process (step 606). During the data synchronization process, the packet size may be increased if the data flow successfully continues for a threshold period of time. Likewise, the packet size may be reduced if the data flow fails within the threshold period of time (step 608).

In an exemplary embodiment, flow control of sync messages are determined based on synchronization mode, system topology, and user authentication. Exemplary sync message flows for various network systems are discussed in FIGS. 7–16 below.

Figure 7:
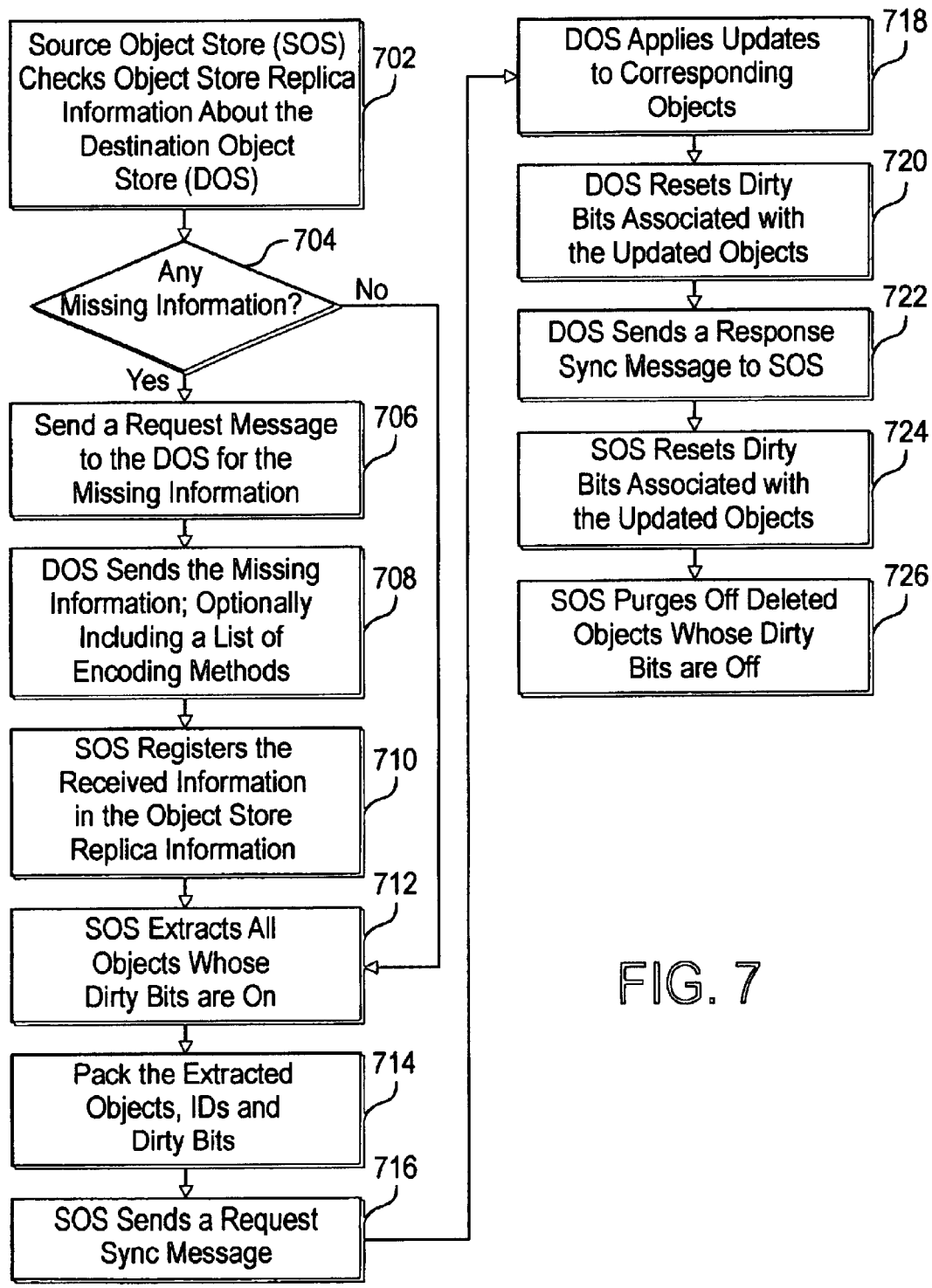
FIG. 7 illustrates another exemplary process in accordance with an embodiment of the invention.

FIG. 7 illustrates an exemplary sync message flow in a push-only synchronization in a one-to-one system in accordance with an embodiment of the invention. At step 702, the source object store checks if the object store replica information corresponding to the destination object store contains the following information on the destination object store: applyUpdateTypes and syncFilter. If either information is missing from the object store replica information (step 704), a request message is sent to the destination object store to ask for the missing information (step 706). For example, if both of applyUpdateTypes and syncFilter are missing from the object store replica information, a sync message is sent with the following fields (see a list of all fields in Appendix A) assigned to the specified values: isRequest—true; clientURL <source object store URL>; serverURL <destination object store URL>; isAskedForApplyUpdateTypes—true; isAskedForSyncFilter—true; usableEncodingMethods <encoding methods supported by source object store>.

The destination object store responds to the request sync message with required information and optionally with a list of encoding methods supported by the destination object store (step 708). The source object store then registers the received information in the object store replica information associated with the destination object store (step 710).

At the source object store, all objects whose dirty bits are on are extracted (step 712). These objects along with their IDs and dirty bits are packed together and represented in an update type acceptable to the destination object store and passable through the syncFilter defined by the destination object store (step 714). The source object store then sends a request sync message with these fields assigned to the specified values (step 716): isRequest—true; isAskedForTotalNumberOfSyncUpdatesReceived—true; syncUpdates <extracted updates>; totalNumberOfSyncUpdates <number of extracted updates>; totalBytesOfSyncUpdates <size in byte of extracted updates after they are encoded>; encodingMethod <encoding method,. if any, used to encode extracted updates>; isLastRequest—true. In an exemplary embodiment, the appropriate values for clientURL, serverURL, and usableEncodingMethods are also provided in the request message if the request message is the first message sent from the source object store to the destination object store in the current synchronization process. The destination object store applies each of the received updates into the corresponding object (step 718), sets dirty bits associated with the updated objects and the object store accordingly (step 720), and sends a response sync message to the request sync message providing the number of updates that was received and successfully processed (step 722). In one embodiment, if the response sync message is the first message sent from the destination object store to the source object store in the current synchronization process, a value for the usableEncodingMethods field is also sent in the response sync message. Upon receipt of the response sync message, the source object store resets the dirty bits associated with the first n updates sent, where n is the value of the totalNumberOfSyncUpdatesReceived field enclosed in the response sync message that the source object store received from the destination object store (step 724). Next, the source object store purges off deleted objects whose dirty bits are off (step 726).

In an exemplary embodiment, the set of updates send by the source object store may be divided into more than one request sync message. In such a case, the last request sync message should contain the isLastRequest field set to "true" to indicate its status as the last request. Sending piecemeal update request sync messages is appropriate especially when a frequently disconnected wireless connection, such as a radio connection, is used.

Figure 8:
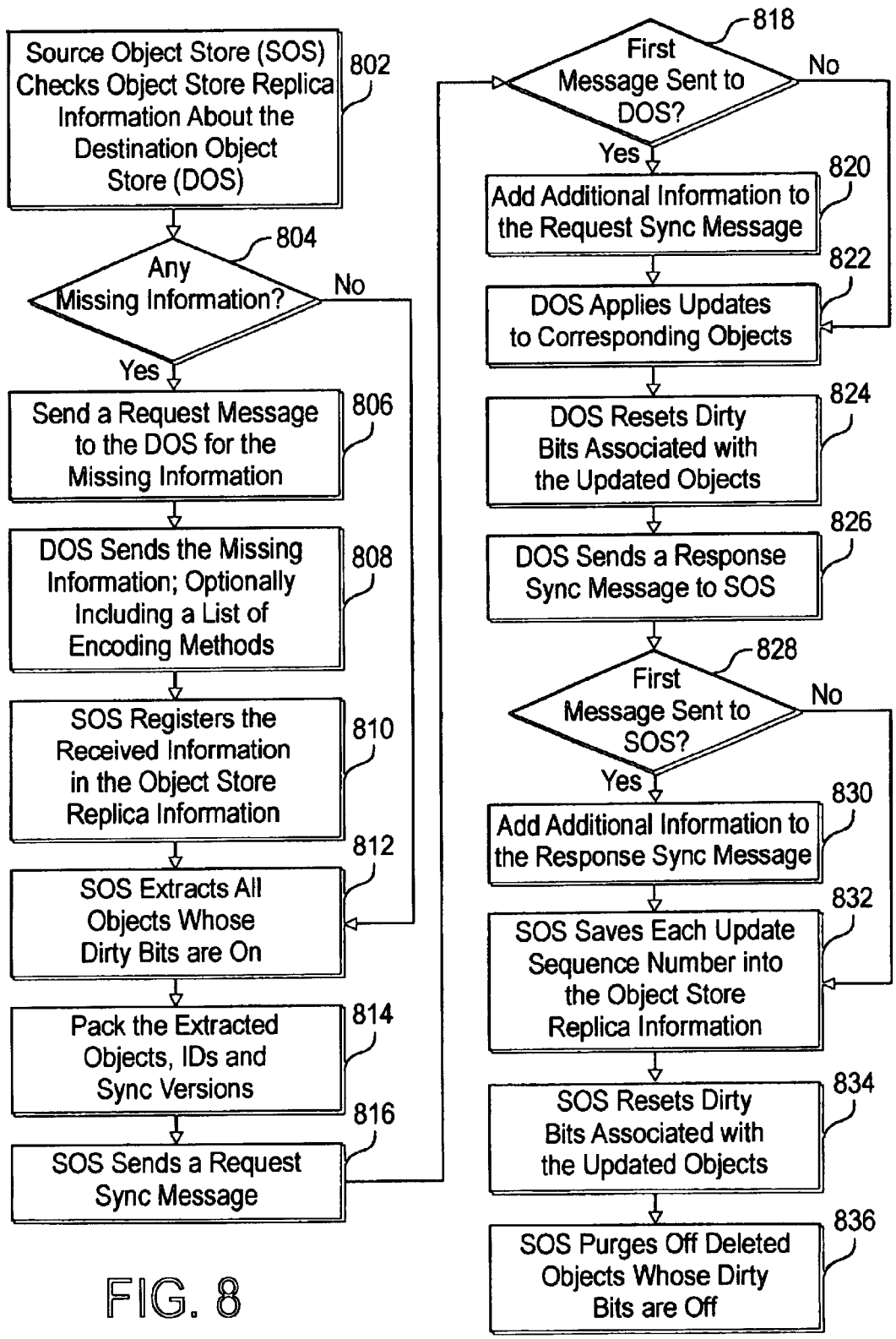
FIG. 8 illustrates another exemplary process in accordance with an embodiment of the invention.

FIG. 8 illustrates an exemplary sync message flow in a push-only, client-to-server synchronization in a client-server system in accordance with an embodiment of the invention. At step 802, the source object store checks if the object store replica information corresponding to the destination object store contains the following information about the destination object store: applyUpdateTypes and syncFilter. If any information is missing from the object store replica information (step 804), a request message is sent to ask for the missing information (step 806). For example, if both of the applyUpdateTypes and syncFilter are missing from the object store replica information, a sync message with these fields assigned to the specified values is sent: isRequest—true; clientURL <source object store URL>; serverURL <destination object store URL>; isAskedForApplyUpdateTypes—true; isAskedForSyncFilter—true; usableEncodingMethods <encoding methods supported by source object store>.

If a request sync message is sent by the source object store, the destination object store responds to the request sync message with required information and optionally with the list of encoding methods supported by the destination object store (step 808). The source object store then registers the received information in the object store replica information associated with the destination object store (step 810).

At the source object store, all objects whose dirty bits are on are extracted (step 812). Object updates, associated object IDs, and sync versions (i.e., a sync version is a combination of a dirty bit and an update sequence number) are packed together and represented in a format acceptable to the destination object store and passable through the syncFilter defined by the destination object store (step 814). The source object store then sends a request sync message with these fields assigned to the specified values (step 816): isRequest—true; isAskedForTotalNumberOfSyncUpdatesReceived—true; syncUpdates <extracted updates>; totalNumberOfSyncUpdates <number of extracted updates>; totalBytesOfSyncUpdates <size in byte of extracted updates after they are encoded.>; encodingMethod <encoding method, if any, used to encode extracted updates>; isLastRequest—true. In an exemplary embodiment, if the request sync message is the first message sent from the source object store to the destination object store in the current synchronization process (step 818), appropriate values for clientURL, ServerURL, and usableEncodingMethods are also provided in the request sync message (step 820). Upon receipt of the request sync message, the destination object store applies each received update into a corresponding object (step 822), updates the update sequence numbers associated with the updated objects and the object store (step 824), and sends a response sync message to the request sync message providing the number of updates that was received and successfully processed (step 826). If this response sync message is the first message sent from the destination object store to the source object store in the current synchronization process (step 828), the value of the usableEncodingMethods field is also provided (step 830). Next, the destination object store saves each update sequence number associated with an updated object into the object store replica information associated with the source object store (step 832). This step prevents redundant update transmission from the destination object store to the source object store at a later time. After receiving the response sync message, the source object store resets the dirty bits associated with the first n updates sent, where n is the value of the totalNumberOfSyncUpdatesReceived field enclosed in the response sync message from the destination object store (step 834). Finally, the source object store purges off deleted objects whose dirty bits are off(step 836).

Figure 9:
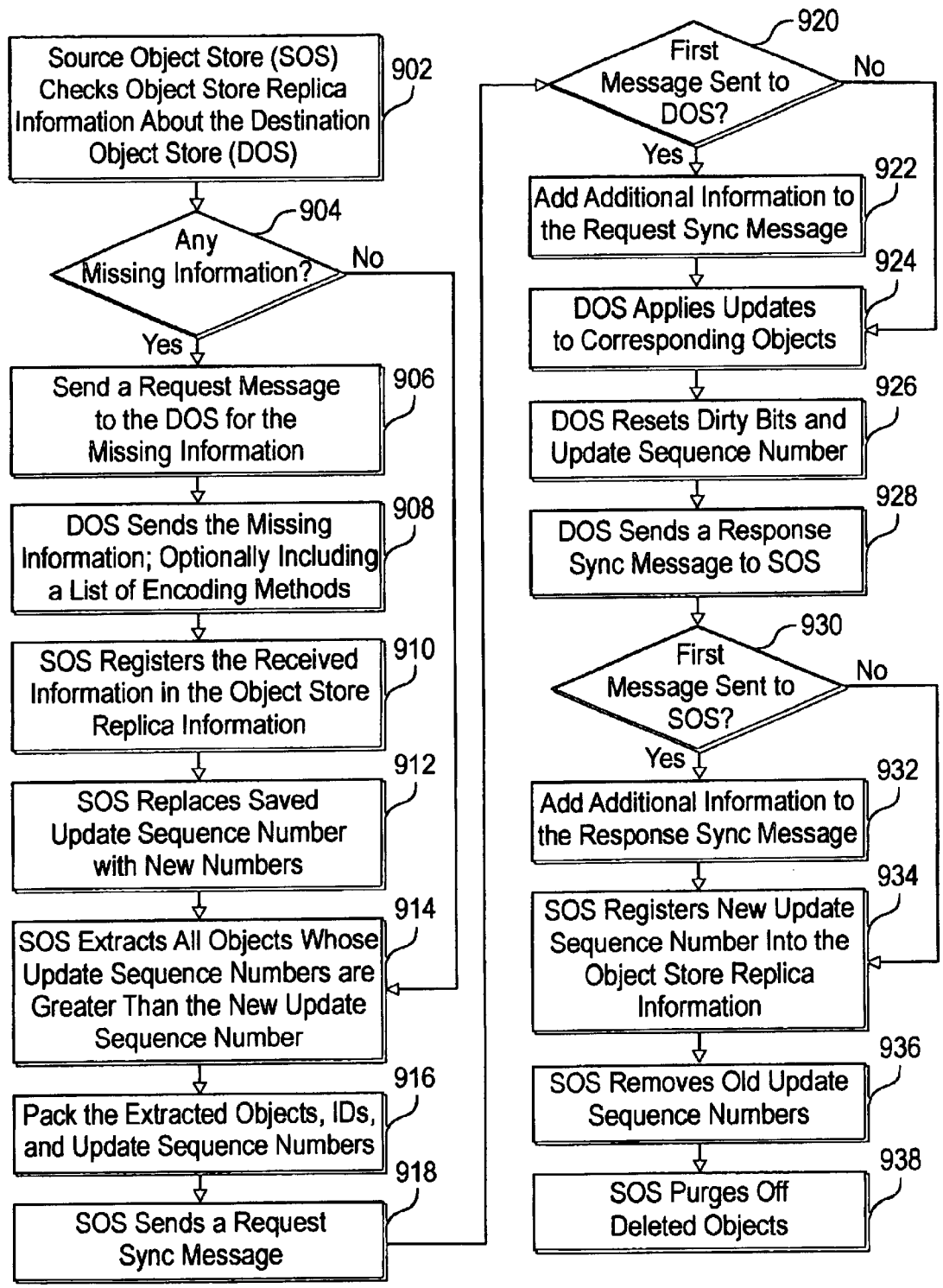
FIG. 9 illustrates another exemplary process in accordance with an embodiment of the invention.

FIG. 9 illustrates an exemplary sync message flow for push-only, server-to-client synchronization in a client-server system in accordance with an embodiment of the invention. At step 902, the source object store checks if the object store replica information corresponding to the destination object store contains the following information on the destination object store: storeVersion, applyUpdateTypes, syncFilter. If any information is missing from the object store replica information (step 904), a request sync message asking for the missing information is sent (step 906). For example, if all of storeVersion, applyUpdateTypes and syncFilter are missing from the object store replica information, a sync message with these fields assigned to the specified values is sent: isRequest—true; clientURL <source object store URL>; serverURL <destination object storeURL>; isAskedForStoreVersion—true; isAskedForApplyUpdateTypes—true; isAskedForSyncFilter—true; usableEncodingMethods <encoding methods supported by source object store>.

If the request sync message is sent by the source object store, the destination object store responds to the request sync message with required information and optionally with the list of encoding methods supported by the destination object store (step 908). The source object store registers the received information in the object store replica information associated with the destination object store (step 910). Next, the source object store removes saved update sequence numbers from the object store replica information that are less than or equal to the new update sequence number, which is the value of the storeVersion field included in the response from the destination object store (step 912).

The source object store extracts all objects whose update sequence numbers are greater than the update sequence number (step 914). These objects, the associated object IDs, and update sequence numbers are packed together and represented in an update type acceptable to the destination object store and passable through the syncFilter defined by the destination object store (step 916). In an exemplary embodiment, the update sequence number associated with any one of the objects should not be an update sequence number saved in the object store replica information. The source object store then sends a request sync message with these fields assigned to the specified values (step 918): isRequest—true; isAskedForStoreVersion—true; syncupdates <extracted updates>; totalNumberOfSyncUpdates <number of extracted updates>; totalBytesOfSyncUpdates <size in byte of extracted updates after they are, if any, encoded>; encodingMethod <encoding method. if any used to encode extracted updates>; isLastRequest—true. In an exemplary embodiment, if the request sync message is the first message sent from the source object store to the destination object store in the current synchronization process (step 920), the appropriate values for clientURL, serverURL, and usableEncodingMethods are also provided in the request sync message (step 922). The destination object store applies each of the received updates to a corresponding object (step 924), sets the dirty bits associated with the updated objects sets and the update sequence number associated with the object store (step 926), and sends a response sync message to the request sync message with the update sequence number associated with the object store (step 928).

In an exemplary embodiment, if the response sync message is the first message sent from the destination object store to the source object store in the current synchronization process (step 930), the value of the usableEncodingMethods field is also provided (step 932). After receiving the response sync message, the source object store registers the new update sequence number, which is the value of the storeVersion field enclosed in the response sync message, in the object store replica information associated with the destination object store (step 934). In one embodiment, the source object store evaluates or reevaluates the update sequence numbers among all remote object stores to determine a common update sequence number. A common update sequence number is the smallest update sequence number among the update sequence numbers associated with all remote replica information. Finally, the source object store removes old update sequence numbers from the object store replica information that are less than or equal to the new update sequence number received as the storeVersion in the response sync message, updates the object store replica information (step 936), and purges off deleted objects that have an update sequence number that is smaller than or equal to the common update sequence number (step 938).

Figure 10:
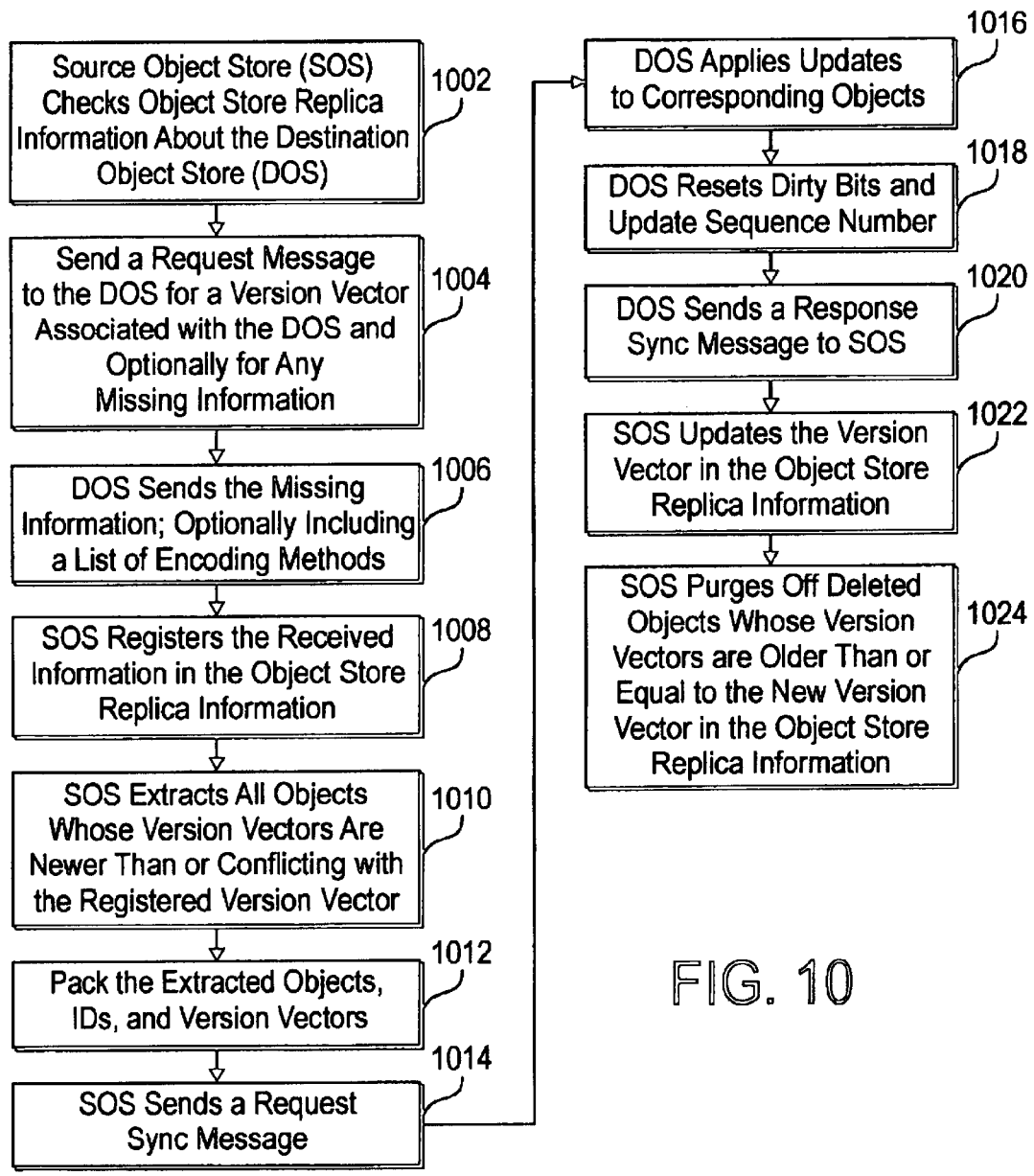
FIG. 10 illustrates another exemplary process in accordance with an embodiment of the invention.

FIG. 10 illustrates an exemplary sync message flow for push-only synchronization in a peer-to-peer system in accordance with an embodiment of the invention. At step 1002, the source object store checks if the object store replica information corresponding to the destination object store contains the following information on the destination object store: apply UpdateTypes and syncFilter. Next, the source object store unconditionally sends a request sync message asking for the version vector associated with the destination object store and optionally any information missing from the object store replica information (step 1004). For example, if both of the applyUpdateTypes and syncFilter are missing from the object store replica information, a sync message with these fields assigned to the specified values is sent: isRequest—true; clientURL <source object store URL>; serverURL <destination object store URL>; isAskedForStoreVersion—true; isAskedForApplyUpdateTypes—true; isAskedForSyncFilter—true; usableEncodingMethods <encoding methods supported by source object store>.

The destination object store responds to the request sync message with the required information and optionally with a list of encoding methods supported by the destination object store (step 1006). Upon receiving the information, the source object store registers the information in the object store replica information associated with the destination object store (step 1008). At the source object store, all objects whose version vectors are newer than or conflicting with the version vector registered in the object store replica information associated with the destination object store are extracted (step 1010). These objects along with their IDs and version vectors are packed together and represented in an update type acceptable to the destination object store and passable through the syncFilter defined on the destination object store (step 1012). The source object store sends a request sync message with these fields assigned to the specified values (step 1014): isRequest—true; isAskedForStoreVersion—true; syncUpdates <extracted updates>; storeVersion <version vector associated with source object store>; totalNumberOfSyncUpdates <number of extracted updates>; totalBytesOfSyncUpdates <size in byte of extracted updates after they are, if any, encoded>; Encodingmethod <encoding method, if any, used to encode extracted updates>; isLastRequest—true.

After receiving the request sync message, the destination object store applies each of the received updates to a corresponding object (step 1016), updates the version vectors associated with the object and the object store (step 1018), and sends a response sync message to the request sync message with the version vector associated with the object store (step 1020). The source object store then updates the version vector, which was received in the response sync message, in the object store replica information associated with the destination object store (step 1022). In one embodiment, the source object store evaluates or reevaluates the version vectors among all remote object stores and determines a common version vector. A common version vector is the version vector who contains the smallest time stamp among the version vectors associated with all remote replica information. Finally, the source object store purges off deleted objects whose version vectors are older than or equal to the common version vector (step 1024).

Figure 11:
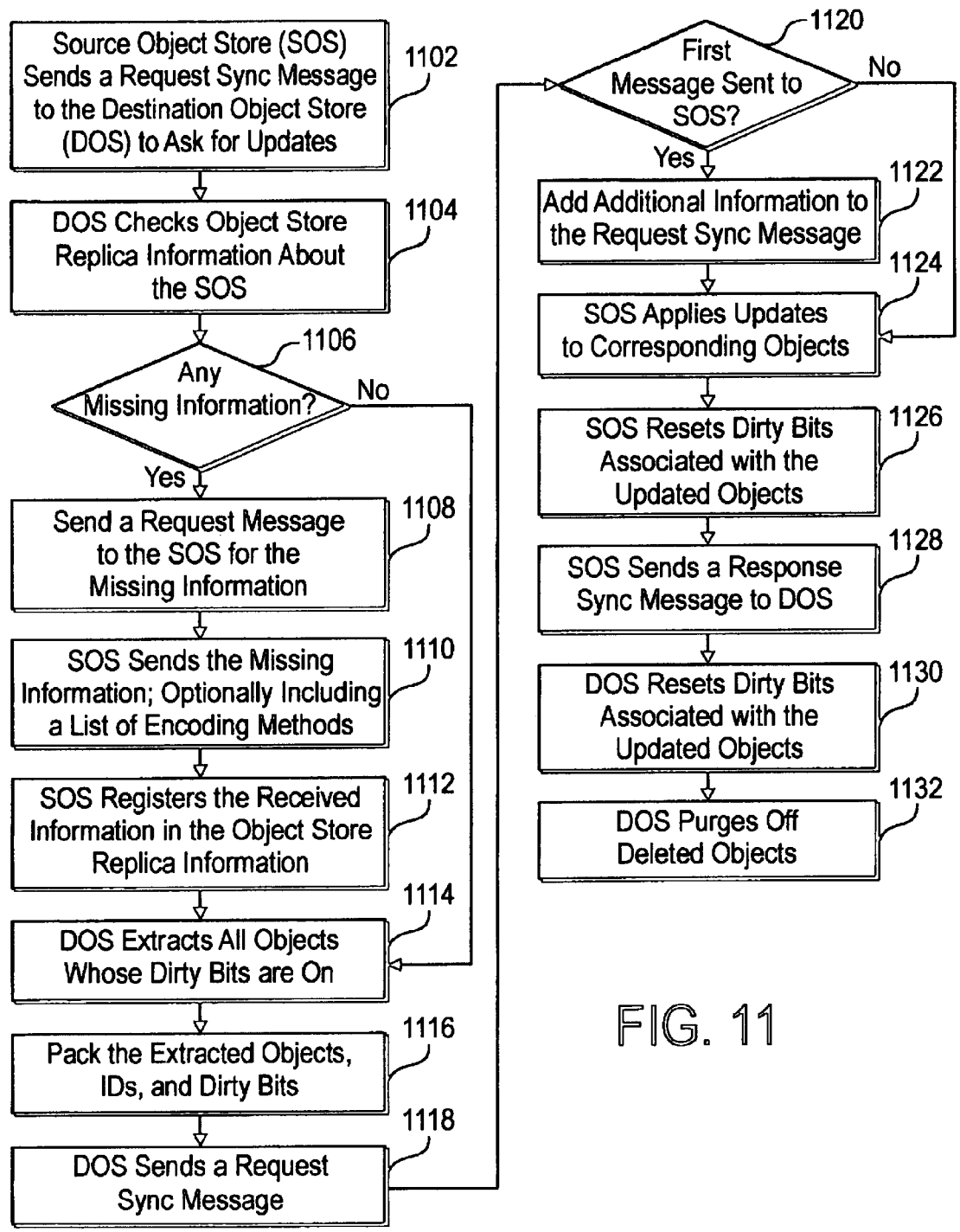
FIG. 11 illustrates another exemplary process in accordance with an embodiment of the invention.

FIG. 11 illustrates an exemplary sync message flow for pull-only in a one-to-one system in accordance with an embodiment of the invention. At step 1102, the source object store sends a request sync message to ask for updates to be extracted and sent from the destination object store. In one embodiment, the following fields are assigned to the specified values in the request sync message: isRequest—true; clientURL <source object store URL>; serverURL <destination object store URL>; isAskedForSyncUpdates—true; usableEncodingMethods <encoding methods supported by source object store>; isLastRequest—true.

The destination object store checks if the object store replica information corresponding to the source object store contains the following information on the source object store: applyUpdateTypes and syncFilter (step 1104). If any of the information is missing from the object store replica information (step 1106), a request sync message is sent to ask for the missing information (step 1108). For example, if both of applyUpdateTypes and syncFilter are missing from the object store replica information, a sync message with these fields assigned to the specified values is sent: isRequest—true; isAskedForApplyUpdateTypes—true; isAskedForSyncFilter—true; usableEncodingMethods <encoding methods supported by destination object store>. Upon receipt of the request sync message from the destination object store, the source object store responds to the request sync message with the required information (step 1110). The destination object store then registers the received information in the object store replica information associated with the source object store (step 1112). Next, the destination object store extracts all objects whose dirty bits are on (step 1114). These objects, their IDs, and dirty bits are packed together and represented in an update type acceptable to the source object store and passable through the syncFilter defined by the source object store (step 1116). The destination object store then sends a response sync message with these fields assigned to the specified values (step 1118): isRequest—false; isAskedForTotalNumberOfSyncUpdatesReceived—true; syncUpdates <extracted updates>; totalNumberOfSyncUpdates <number of extracted updates>; totalBytesOfSyncUpdates <size in byte of extracted updates after they are encoded>; Encodingmethod <encoding method, if any, used to encode extracted updates>. If the response sync message is the first message sent from the destination object store to the source object store in the current synchronization process (step 1120), appropriate values for usableEncodingMethods are also provided in the response sync message (step 1122). After receiving the response sync message, the source object store applies each of the received updates to the corresponding object (step 1124), sets dirty bits associated with the updated objects and the object store (step 1126), and sends a response sync message to the received response sync message providing the number of updates that was received and successfully processed (step 1128). The destination object store then resets the dirty bits associated with the first n updates sent, where n is the value of the totalNumberOfSyncUpdatesReceived field in the response sync message from the source object store (step 1130). Finally, the destination object store purges off deleted objects whose dirty bits are off (step 1132). In general, the process described in FIG. 11 is the reverse of the process described above in FIG. 7; namely, the steps performed by the source object store in FIG. 7 is now performed by the destination object store in FIG. 11, and vice versa.

The sync message flow for pull-only, client-to-server synchronization in a client-server system is generally the reverse of the exemplary process described above in FIG. 8. Likewise, the sync message flow for pull-only, server-to-client synchronization in a client-server system is generally the reverse of the exemplary process described above in FIG. 9. The sync message flow for pull-only synchronization in a peer-to-peer system is generally the reverse of the exemplary process described above in FIG. 10.

Figure 12A:
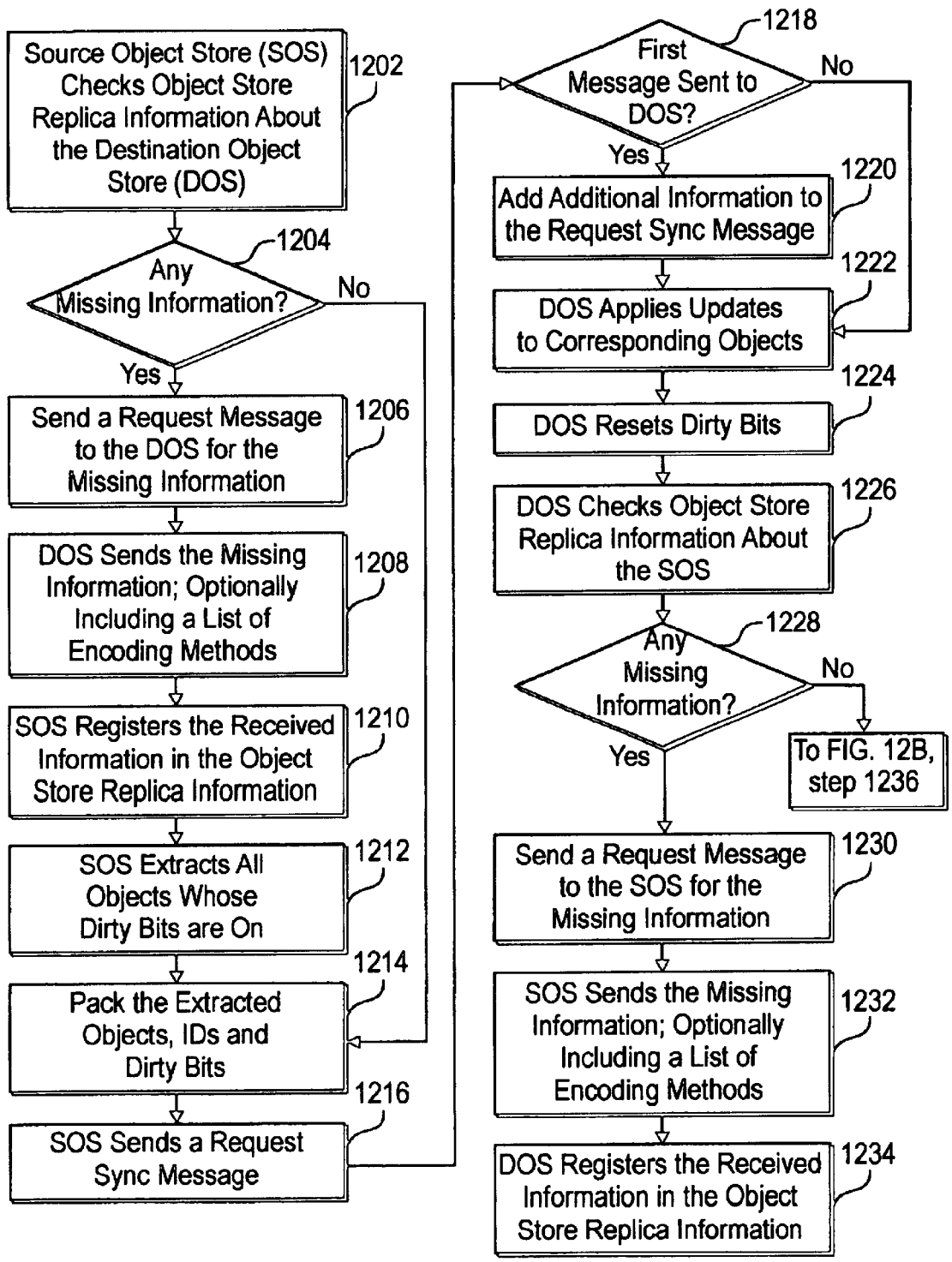
FIGS. 12A–B illustrate another exemplary process in accordance with an embodiment of the invention.
Figure 12B:
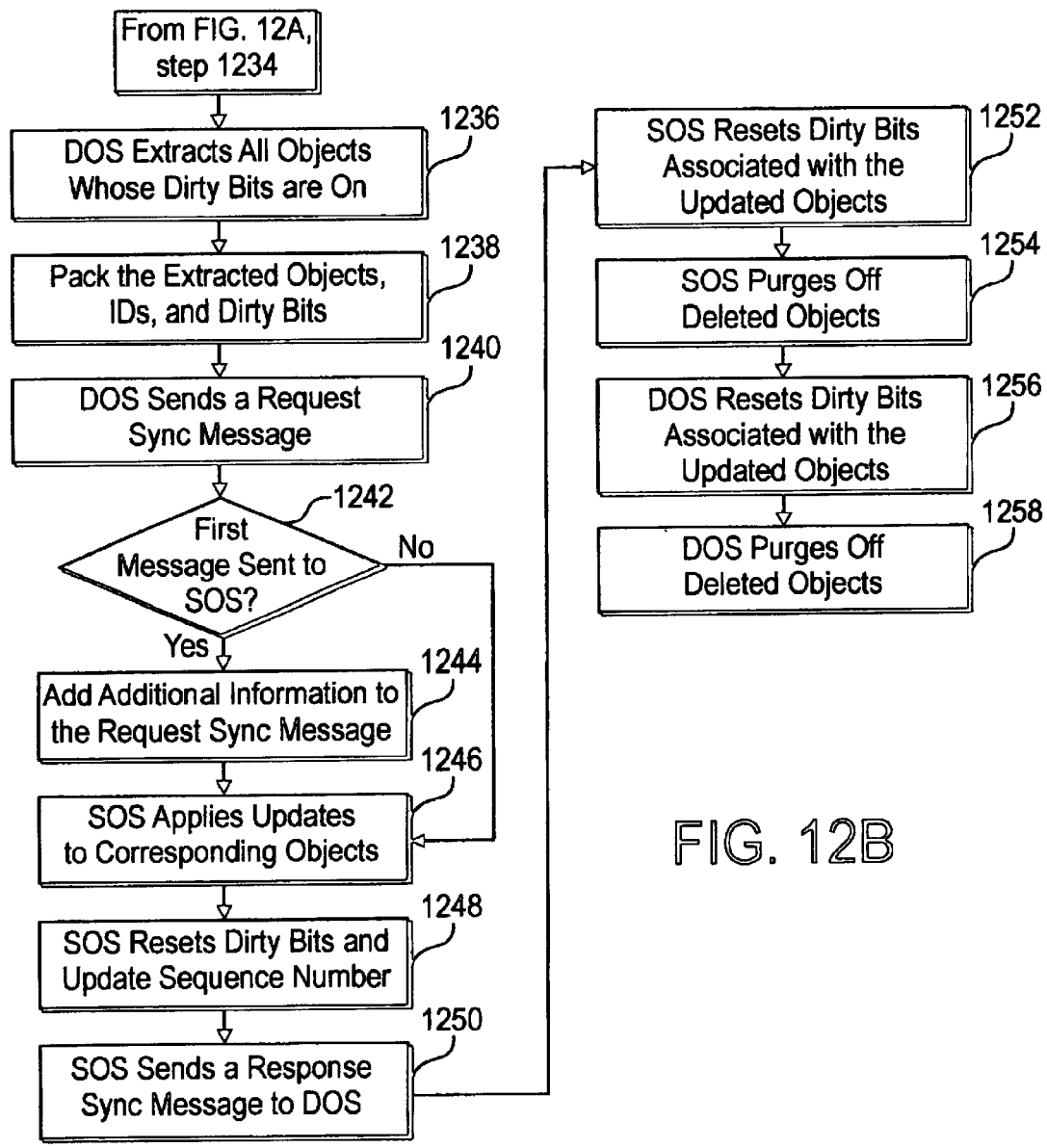

FIGS. 12A–B illustrate an exemplary sync message flow for push-then-pull synchronization in a one-to-one system in accordance with an embodiment of the invention. At step 1202, the source object store checks if the object store replica information corresponding to the destination object store contains the following information on the destination object store: apply UpdateTypes and syncFilter. If any information is missing from the object store replica information (step 1204), a request sync message asking for the missing information is sent (step 1206). For example, if both of the applyUpdateTypes and syncFilter are missing from the object store replica information, a sync message with these fields assigned to the specified values: isRequest—true; clientURL <source object store URL>; serverURL <destination object store URL>; isAskedForApplyUpdateTypes—true; isAskedForSyncFilter—true; usableEncodingMethods <encoding methods supported by source object store>.

The destination object store responds to the request sync message with required information and optionally with a list of encoding methods supported by the destination object store (step 1208). The source object store then registers the received information in the object store replica information associated with the destination object store (step 1210).

Next, the source object store extracts objects whose dirty bits are on (step 1212). These objects, their IDs, and dirty bits are packed together and represented in an update type acceptable to the destination object store and passable through the syncFilter defined on the destination object store (step 1214). The source object store then sends a request sync message with these fields assigned to the specified values (step 1216): isRequest—true; isAskedForTotalNumberOfSyncUpdatesReceived—true; syncupdates <extracted updates>; totalNumberOfSyncUpdates <number of extracted updates>; totalBytesOfSyncUpdates <size in byte of extracted updates after they are encoded>; isAskedForSyncUpdates—true; Encodingmethod <encoding method, if any, used to encode extracted updates>; isLastRequest—true. If the request is the first message sent from the source object store to the destination object store in the current synchronization process (step 1218), the appropriate values for clientURL, ServerURL, and usableEncodingMethods are also provided in the request sync message (step 1220). The destination object store applies each of the received updates to a corresponding object (step 1222) and sets dirty bits associated with the updated objects and the object store (step 1224). Next, the destination object store checks if the object store replica information corresponding to the source object store contains the following information on the source object store: applyUpdateTypes and syncFilter (step 1226). If any information is missing from the object store replica information (step 1228), a request sync message asking for the missing information is sent (step 1230). For example, if both of the applyUpdateTypes and syncFilter are missing from the object store replica information, a sync message with these fields assigned to the specified values is sent: isRequest—true; isAskedForApplyUpdateTypes—true; isAskedForSyncFilter—true; usableEncodingMethods <encoding methods supported by destination object store>. After receiving the request sync message, the source object store responds to the request sync message with the required information (step 1232). The destination object store then registers the received information in the object store replica information associated with the source object store (step 1234). Next, the destination object store extracts all objects whose dirty bits are on (step 1236). These objects, their IDs, and dirty bits are packed together and represented in an update type acceptable to the source object store and passable through the syncFilter defined by the source object store (step 1238). The destination object store then sends a response sync message with these fields assigned to the specified values (step 1240): isRequest—false; isAskedForTotalNumberOfSyncUpdatesReceived—true; syncupdates <extracted updates>; totalNumberOfSyncUpdates <number of extracted updates>; totalBytesOfSyncUpdates <size in byte of extracted updates after they are encoded>; TotalNumberOfSyncUpdatesReceived <number of updates received and successfully processed by destination object store>; Encodingmethod <encoding method, if any, used to encode extracted updates>.

If the response sync message is the first message sent from the destination object store to the source object store in the current synchronization process (step 1242), the appropriate values for usableEncodingMethods are also provided in the response sync message (step 1244). The source object store applies each of the received updates to a corresponding object (step 1246), sets dirty bits associated with the object and the object store (step 1248), and sends a response message to the received response sync message providing the number of updates that was received and successfully processed (step 1250). The source object store resets dirty bits associated with the first n updates sent, where n is the value of the totalNumberOfSyncUpdatesReceived field included in the response sync message received from the destination object store (step 1252). The source object store purges off deleted objects whose dirty bits are off (step 1254). Further, the destination object store resets dirty bits associated with the first m updates sent, where m is the value of the totalNumberOfSyncUpdatesReceived field included in the response sync message received from the source object store (step 1256). Finally, the destination object store purges off deleted objects whose dirty bits are off (step 1258).

Figure 13A:
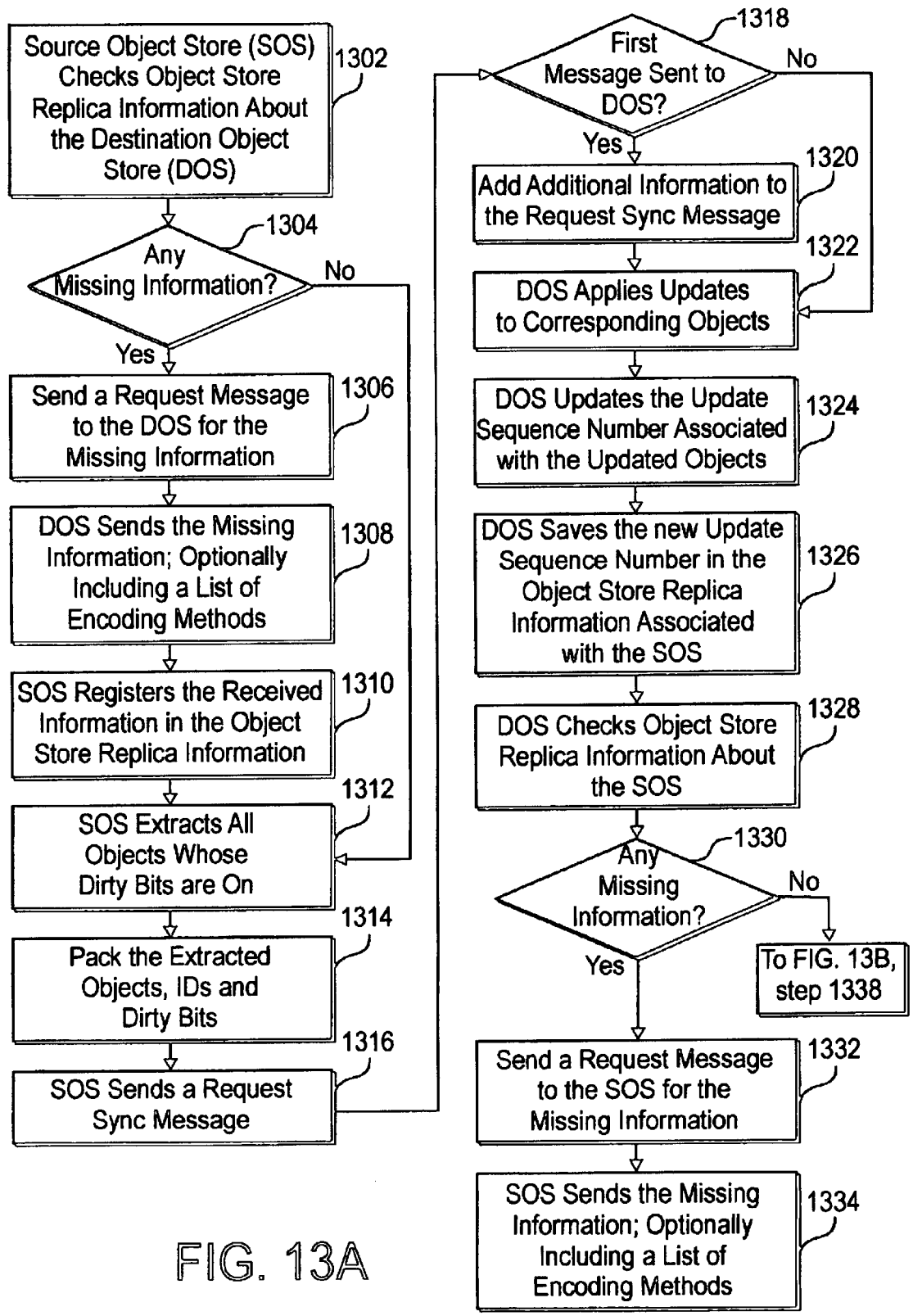
FIGS. 13A–B illustrate another exemplary process in accordance with an embodiment of the invention.
Figure 13B:
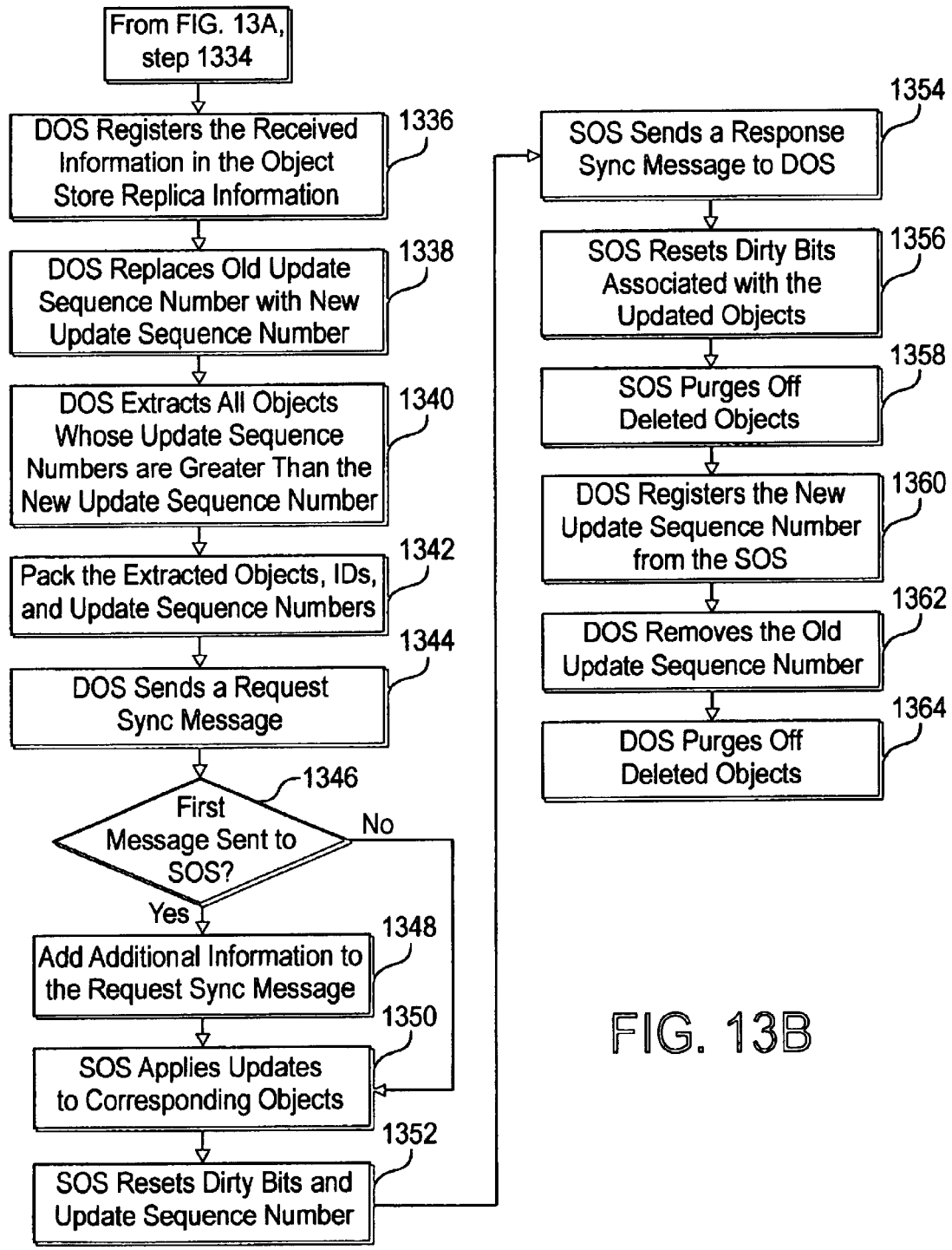
Figure 14A:
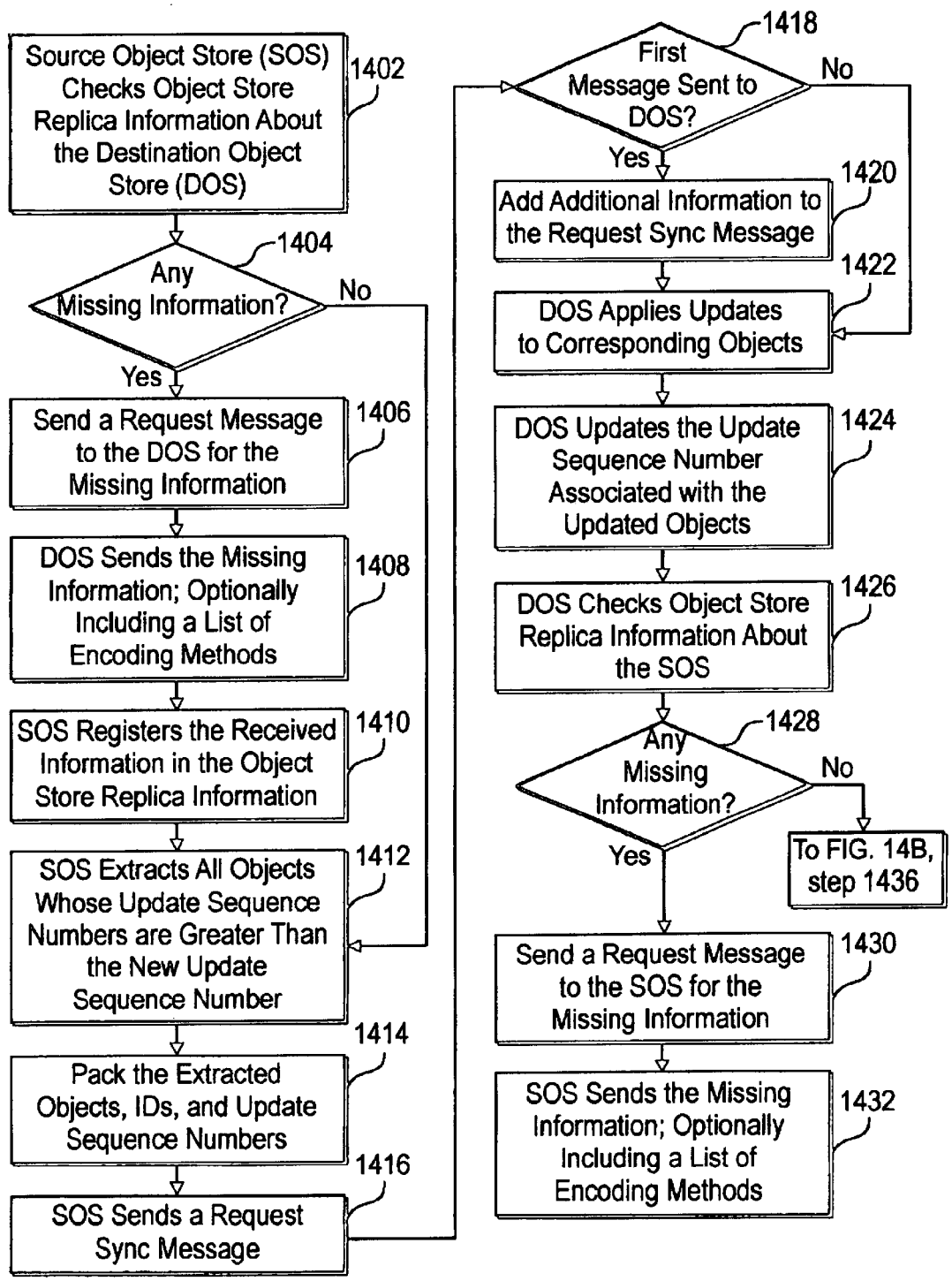
FIGS. 14A–B illustrate another exemplary process in accordance with an embodiment of the invention.
Figure 14B:
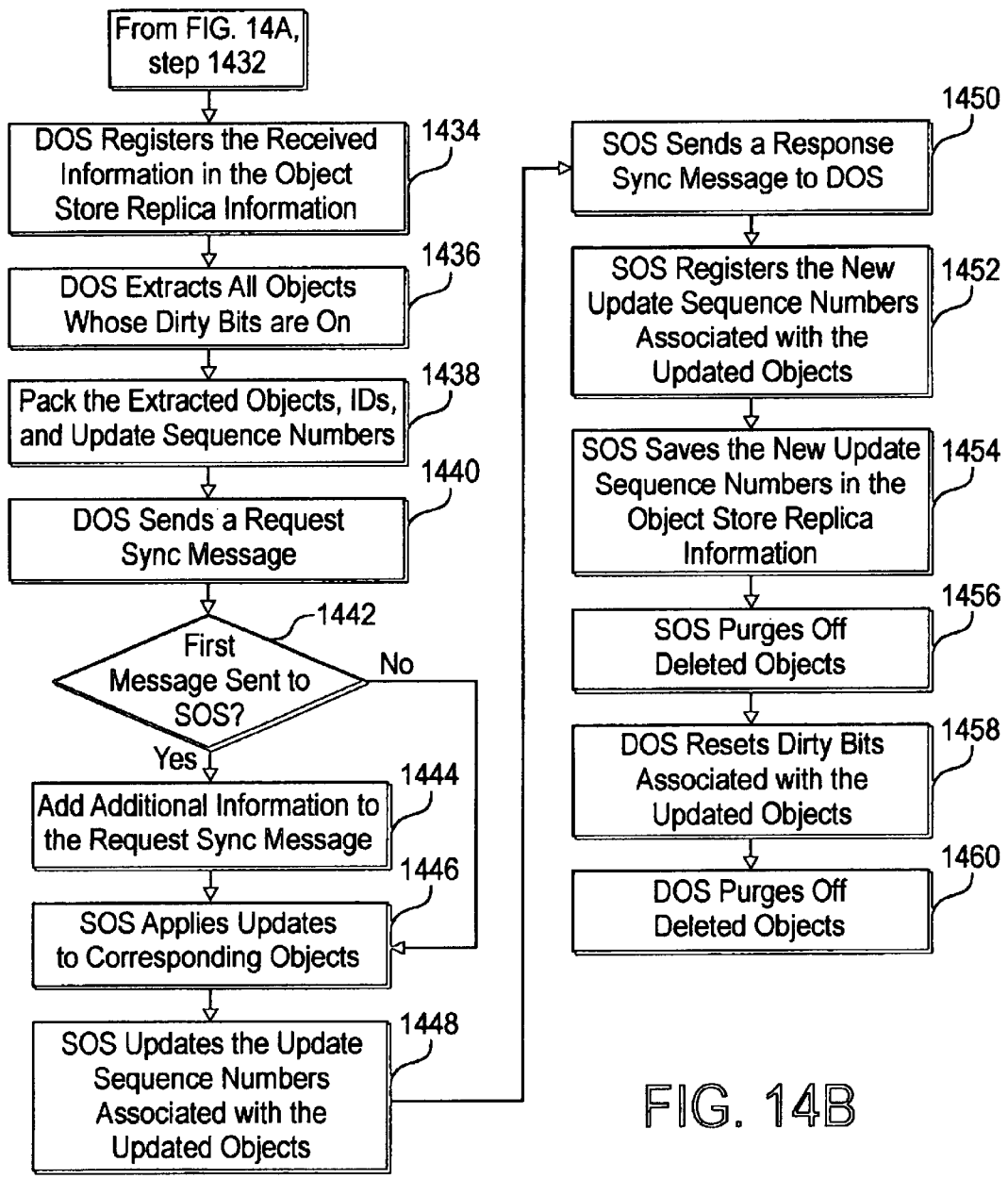
Figure 15A:
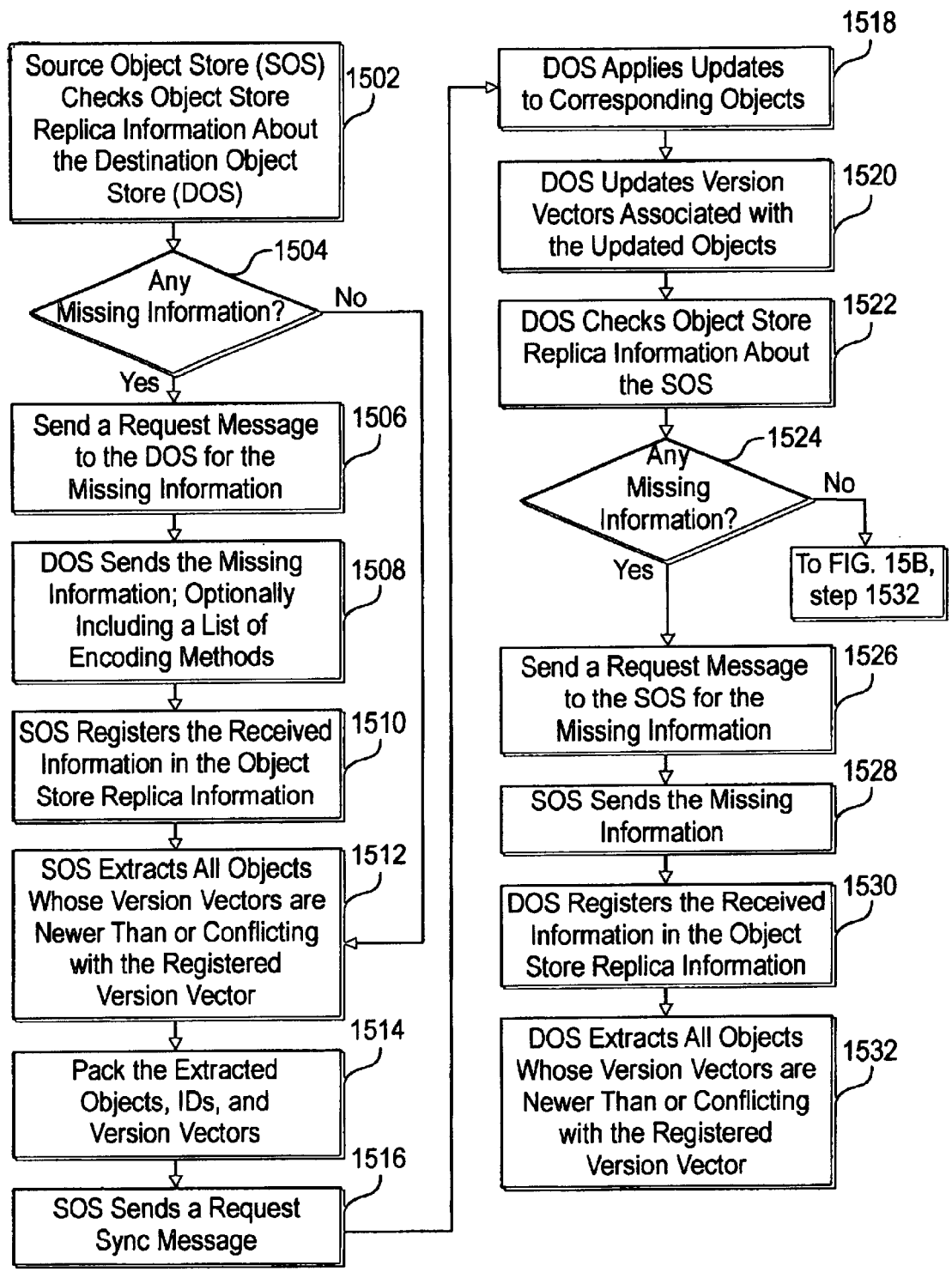
FIGS. 15A–B illustrate another exemplary process in accordance with an embodiment of the invention.
Figure 15B:
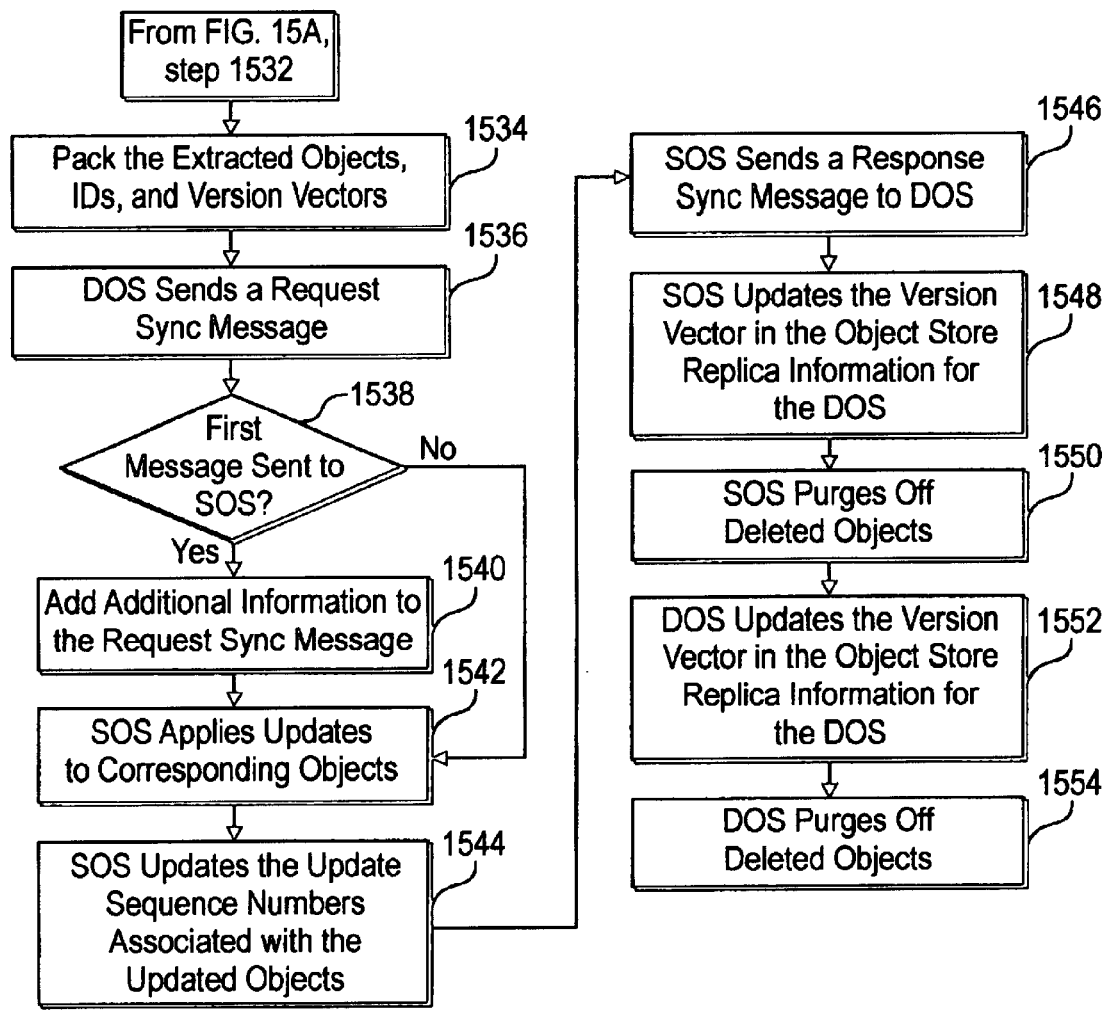

FIGS. 13A–B illustrate an exemplary sync message flow for push-the-pull, client-to-server synchronization in a client-server system in accordance with an embodiment of the invention. At step 1302, the source object store checks if the object store replica information corresponding to the destination object store contains the following information on the destination object store: apply UpdateTypes and syncFilter. If any information is missing from the object store replica information (step 1304), a request sync message asking for the missing information is sent (step 1306). For example, if both of the applyUpdateTypes and syncFilter are missing from the object store replica information, a sync message with these fields assigned to the specified values is sent: isRequest—true; clientURL <source object store URL>; serverURL <destination object store URL>; isAskedForApplyUpdateTypes—true; isAskedForSyncFilter—true; usableEncodingMethods <encoding methods supported by source object store>.

After receiving the request sync message, the destination object store responds to the request sync message with the required information and optionally with a list of encoding methods supported by the destination object store (step 1308). The source object store then registers the received information in the object store replica information associated with the destination object store (step 1310). The source object store extracts objects whose dirty bits are on (step 1312). These objects, their IDs, and sync versions (i.e., a sync version is a combination of a dirty bit and an update sequence number) are packed together and represented in an update type acceptable to the destination object store and passable through the syncFilter defined by the destination object store (step 1314). The source object store then sends a request sync message with these fields assigned to the specified values (step 1316): isRequest—true; isAskedForTotalNumberOfSyncUpdatesReceived—true;

syncupdates <extracted updates>; totalNumberOfSyncUpdates <number of extracted updates>; totalBytesOfSyncUpdates <size in byte of extracted updates after they are encoded>; isAskedForSyncUpdates—true; Encoding-method <encoding method, if any, used to encode extracted updates>; isLastRequest—true. If the request sync message is the first message sent from the source object store to the destination object store in the current synchronization process (step 1318), the appropriate values for clientURL, serverURL, and usableEncodingMethods are also provided in the request sync message (step 1320). The destination object store applies each of the received updates to a corresponding object (step 1322) and updates the update sequence numbers associated with the application object and the object store (step 1324). The destination object store then saves the update sequence number associated with an updated object into the object store replica information associated with the source object store (step 1326).

The destination object store checks if the object store replica information corresponding to the source object store contains the following information on the source object store: store Version, apply UpdateTypes, and syncFilter (step 1328). If any information is missing from the object store replica information (step 1330), a request sync message asking for the missing information is sent (step 1332). For example, if all of the storeVersion, applyUpdateTypes, and syncFilter are missing from the object store replica information, a sync message with these fields assigned to the specified values is sent: isRequest—true; isAskedForStoreVersion—true; isAskedForApplyUpdateTypes—true; isAskedForSyncFilter—true; usableEncodingMethods <encoding methods supported by source object store>.

After receiving the request sync message from the destination object store, the source object store responds to the request sync message with the required information (step 1334). The destination object store then registers the received information in the object store replica information associated with the source object store (step 1336). The destination object store removes saved update sequence numbers from the object store replica information that are less than or equal to the new update sequence number, which is the value of the storeVersion field included in the response sync message from the source object store (step 1338). The destination object store extracts objects whose update sequence numbers are greater than the new update sequence number (step 1340). These objects, their IDs, and update sequence numbers are packed together and represented in an update type acceptable to the source object store and passable through the syncFilter defined on the source object store (step 1342). In an exemplary embodiment, the update sequence number associated with any objects should not be an update sequence number saved in the object store replica information. Next, the destination object store sends a response sync message with these fields assigned to the specified values (step 1344): isRequest—false; isAskedForStoreVersion—true; syncupdates <extracted updates>; totalNumberOfSyncUpdates <number of extracted updates>; totalBytesOfSyncUpdates <size in byte of extracted updates after they are encoded>; totalNumberOfSyncUpdatesReceived <number of updates received and successfully processed by destination object store>; encodingMethod <encoding method, if any, used to encode extracted updates>.

If the response sync message is the first message sent from the destination object store to the source object store in the current synchronization process (step 1346), the appropriate values for usableEncodingMethods is also provided in the response sync message (step 1348). The source object store applies each of the received updates to a corresponding object (step 1350), sets the dirty bit associated with the updated objects and the update sequence number associated with the object store (step 1352), and sends a response sync message to the received response sync message with the update sequence number associated with the source object store (step 1354). The source object store then resets the dirty bits associated with the first n updates it sent, where n is the value of the totalNumberOfSyncUpdates Received field included in the response sync message received from the destination object store (step 1356). Next, the source object store purges off deleted objects whose dirty bits are off (step 1358). The destination object store registers the new update sequence number in the object store replica information associated with the source object store (step 1360) and determines a common update sequence number. Finally, the destination object store removes saved update sequence numbers from the object store replica information that are less than or equal to the new update sequence number received as the storeVersion in the response sync message (step 1362) and purges off deleted objects whose update sequence numbers are less than or equal to the common update sequence number (step 1364).

FIG. 14 illustrates an exemplary sync message flow for push-then-pull, server-to-client synchronization in a client-server system in accordance with an embodiment in the invention. At step 1402, the source object store checks if the object store replica information corresponding to the destination object store contains the following information on the destination object store: store Version, applyUpdateTypes, and syncFilter. If any information is missing from the object store replica information (step 1404), a request sync message asking for the missing information is sent (step 1406). For example, if all of the storeVersion, applyUpdateTypes and syncFilter are missing from the object store replica information, a sync message with these fields assigned to the specified values is sent: isRequest—true; clientURL <source object store URL>; serverURL <destination object store URL>; isAskedForStoreVersion—true; isAskedForApplyUpdateTypes—true; isAskedForSyncFilter—true; usableEncodingMethods <encoding methods supported by source object store>. After receiving the request sync message, the destination object store responds to the request sync message with required information and optionally with a list of encoding methods supported by the destination object store (step 1408). The source object store then registers the received information in the object store replica information associated with the destination object store and removes saved update sequence numbers from the object store replica information that are less than or equal to the update sequence number (step 1410). In an exemplary embodiment, the update sequence number is the value of the storeVersion field included in the received response sync message. Next, the source object store extracts all objects whose update sequence numbers are greater than the new update sequence number (step 1412). These objects, their IDs, and update sequence numbers are packed together and represented in a update type acceptable to the destination object store and passable through the syncFilter defined by the destination object store (step 1414). In an exemplary embodiment, the update sequence number associated with any object should not be an update sequence number saved in the object store replica information. The source object store then sends a request sync message with these fields assigned to the specified values (step 1416): isRequest—true; isAskedForStoreVersion—true; syncUpdates <extracted updates>; totalNumberOfSyncUpdates <number of extracted updates>; totalBytesOfSyncUpdates <size in byte of extracted updates after they are encoded>; isAskedForSyncUpdates—true; encodingMethod <encoding method, if any, used to encode extracted updates>; isLastRequest—true. If this request sync message is the first message sent from the source object store to the destination object store in the current synchronization process (step 1418), the appropriate values for clientURL, serverURL, and usableEncodingMethods are also provided in the request sync message (step 1420). The destination object store applies each of the received updates to a corresponding object (step 1422) and sets the dirty bit associated with the updated objects and the update sequence number associated with the object store (step 1424).

Next, the destination object store checks if the object store replica information corresponding to the source object store contains the following information on the source object store: applyUpdateTypes and syncFilter (step 1426). If any information is missing from the object store replica information (step 1428), a request sync message asking for the missing information is sent (step 1430). For example, if both of the applyUpdateTypes and syncFilter are missing from the object store replica information, a sync message with these fields assigned to the specified values is sent: isRequest—true; isAskedForApplyUpdateTypes—true; isAskedForSyncFilter—true; usableEncodingMethods <encoding methods supported by source object store>. After receiving the request sync message, the source object store responds to the request sync message with required information (step 1432). The destination object store then registers the received information in the object store replica information associated with the source object store (step 1434).

Next, the destination object store extracts objects whose dirty bit are on (step 1436). These objects, their IDs, and sync versions are packed together and represented in an update type acceptable to the source object store and passable through the syncFilter defined on the source object store (step 1438). The destination object store then sends a response sync message with these fields assigned to the specified values (step 1440): isRequest—false; isAskedForTotalNumberOfSyncUpdatesReceived—true; syncupdates <extracted updates>; totalNumberOfSyncUpdates <number of extracted updates>; totalBytesOfSyncUpdates <size in byte of extracted updates after they are, if any, encoded>; storeVersion <Sync Version associated with destination object store>; encodingMethod <encoding method, if any, used to encode extracted updates>. If the response sync message is the first message sent from the destination object store to the source object store in the current synchronization process (step 1442), an appropriate value of the usableEncodingMethods field is provided in the response sync message (step 1444). The source object store applies each of the received updates to a corresponding object (step 1446), updates the update sequence numbers associated with the updated objects and the object store (step 1448), and sends a response sync message to the received response sync message providing the number of updates that was received and successfully processed (step 1450). The source object store registers the new update sequence number, which the value of the storeVersion field enclosed in the response sync message from the destination object store, in the object store replica information associated with the destination object store (step 1452). The source object store then saves the update sequence number associated with each replaced object in the object store replica information associated with the destination object store (step 1454). In one embodiment, the source object store evaluates or reevaluates the update sequence numbers among all remote object stores to determine a common update sequence number. A common update sequence number is the smallest update sequence number among the update sequence numbers associated with all remote replica information. Finally, the source object store purges off deleted objects whose update sequence numbers are less than or equal to the common update sequence number (step 1456).

Next, the destination object store resets the dirty bits associated with the first n updates sent, where n is the value of the totalNumberOfSyncUpdatesReceived field included in the response sync message from the source object store (step 1458). The destination object store purges off the deleted objects whose dirty bits are off (step 1460).

FIG. 15 illustrates an exemplary sync message flow for push-then-pull in a peer-to-peer system in accordance with an embodiment of the invention. At step 1502, the source object store checks if the object store replica information corresponding to the destination object store contains the following information on the destination object store: applyUpdateTypes and syncFilter. If any information is missing (step 1504), a request sync message asking for the missing information is sent (step 1506). For example, if both of the applyUpdateTypes and syncFilter are missing from the object store replica information, a sync message with these fields assigned to the specified values is sent: isRequest—true; clientURL <source object store URL>; serverURL <destination object store URL>; isAskedForStoreVersion—true; isAskedForApplyUpdateTypes—true; isAskedForSyncFilter—true; usableEncodingMethods <encoding methods supported by source object store>. The destination object store responds to the request sync message with the required information and optionally with the list of encoding methods supported by the destination object store (step 1508). The source object store then registers the received information in the object store replica information associated with the destination object store (step 1510).

Next, the source object store extracts objects whose version vectors are newer than or conflicting with the version vector registered in the object store replica information associated with the destination object store (step 1512). These objects, their IDs and version vectors are packed together and represented in an update type acceptable to the destination object store and passable through the syncFilter defined on the destination object store (step 1514). The source object store then sends a request sync message with these fields assigned to the specified values (step 1516): isRequest—true; isAskedForStoreVersion—true; syncupdates <extracted updates>; storeVersion <Sync Version associated with source object store>; totalNumberOfSyncUpdates <number of extracted updates>; totalBytesOfSyncUpdates <size in byte of extracted objects after they are encoded>; isAskedForSyncUpdates—true; encodingMethod—<encoding method, if any, used to encode extracted updates>; isLastRequest—true. The destination object store applies each of the received updates to a corresponding object (step 1518) and updates the version vectors associated with the application object and the object store (step 1520).

Next, the destination object store checks if the object store replica information corresponding to the source object store contains the following information on the source object store: applyUpdateTypes and syncFilter (step 1522). If any information is missing from the object store replica information (step 1524), a request sync message asking for the missing information is sent (step 1526). For example, if both of the applyUpdateTypes and syncFilter are missing from the object store replica information, a sync message with these fields assigned to the specified values is sent: isRequest—true; isAskedForApplyUpdateTypes—true; isAskedForSyncFilter—true. After receiving the request sync message, the source object store responds to the request sync message with the required information (step 1528). The destination object store then registers the received information in the object store replica information associated with the source object store (step 1530).

Next, the destination object store extracts objects whose version vectors are newer than or conflicting with the version vector registered in the object store replica information associated with the source object store (step 1532). These objects, their IDs, and version vectors are packed together and represented in an update type acceptable to the source object store and passable through the syncFilter defined by the source object store (step 1534). The destination object store then sends a response sync message with these fields assigned to the specified values (step 1536): isRequest—false; isAskedForStoreVersion—true; syncUpdates <extracted updates>; storeVersion <Sync Version associated with destination object Store>; totalNumberOfSyncUpdates <number of extracted updates>; totalBytesOfSyncUpdates <size in byte of extracted updates after they are encoded>; encodingMethod <encoding method, if any, used to encode extracted updates>. If the response sync message is the first message sent from the responding to the source object store in the current synchronization process (step 1538), an appropriate value of the usableEncodingMethods field is also provided in the response sync message (step 1540).

The source object store applies each of the received updates into a corresponding object (step 1542), updates the version vectors associated with the application object and the object store (step 1544), and sends a response sync message to the received response sync message with the sync version associated with the source object store (step 1546). The source object store updates the version vector from the destination object store in the object store replica information associated with the destination object store (step 1548). In one embodiment, the source object store evaluates or reevaluates the version vectors among all remote object stores to determine a common version vector. A common version vector is the version vector who has the smallest time stamp among the version vectors associated with all remote replica information. Finally, the source object store purges off deleted objects whose version vectors are older than or equal to the common version vector (step 1550).

Likewise, the destination object store updates the version vector from the source object store in the object store replica information associated with the source object store (step 1552). In one embodiment, the destination object store evaluates or reevaluates the version vectors among all remote object stores to determine a common version vector. A common version vector is the version vector who has the smallest time stamp among the version vectors associated with all remote replica information. Finally, the destination object store purges off deleted objects whose version vectors are older than or equal to the common version vector (step 1554).

FIG. 16 illustrates an exemplary sync message flow for pull-then-push synchronization in a one-to-one system in accordance with an embodiment of the invention. At step 1602, the source object store checks if the object store replica information corresponding to the destination object store contains the following information on the destination object store: applyUpdateTypes and syncFilter. In an exemplary embodiment, the source object store unconditionally sends a request sync message asking for updates to be sent from the destination object store and optionally any missing information in the object store replica information (step 1604). For example, if both of the applyUpdateTypes and syncFilter are missing from the object store replica information, a sync message with these fields assigned to the specified values is sent: isRequest—true; clientURL <source object store URL>; serverURL <destination object store URL>; isAskedForApplyUpdateTypes—true; isAskedForSyncFilter—true; isAskedForSyncUpdates—true; usableEncodingMethods <encoding methods supported by source object store>.

The destination object store checks if the object store replica information corresponding to the source object store contains the following information on the source object store: applyUpdateTypes and syncFilter (step 1606). If any information is missing from the object store replica information (step 1608), a request sync message asking for the missing information is sent (step 1610). For example, if both of the applyUpdateTypes and syncFilter are missing from the object store replica information, a sync message with these fields assigned to the specified values is sent: isRequest—true; isAskedForApplyUpdateTypes—true; isAskedForSyncFilter—true; usableEncodingMethods <encoding methods supported by source object store>. After receiving the request sync message, the source object store responds to the request sync message with the required information (step 1612). The destination object store then registers the received information in the object store replica information associated with the source object store (step 1614).

Next, the destination object store extracts objects whose dirty bits are on (step 1616). These objects, their IDs, and dirty bits are packed together and represented in an update acceptable to the source object store and passable through the syncFilter defined on the source object store (step 1618). The destination object store then sends a response sync message with these fields assigned to the specified values (step 1620): isRequest—false; isAskedForTotalNumberOfSyncUpdatesReceived—true; syncupdates <extracted updates>; totalNumberOfSyncUpdates <number of extracted updates>; totalBytesOfSyncUpdates <size in byte of extracted updates after they are encoded>; encodingMethod <encoding method, if any, used to encode extracted updates>. If this response sync message is the first message sent from the destination object store to the source object store in the current synchronization process (step 1622), appropriate values for the applyUpdateTypes and syncFilter fields are provided if such information was inquired in the received request sync message (step 1624). The source object store applies each of the received updates to a corresponding application object (step 1626), sets the dirty bits for the updated object and the object store (step 1628), and sends a response sync message to the received response sync message providing the number of updates that was received and successfully processed (step 1630). The source object store registers the other information it received, if any, in the object store replica information associated with the destination object store (step 1632). The destination object store then resets the dirty bits associated with the first n updates sent, where n is the value of the totalNumberOfSyncUpdatesReceived field in the response sync message received from the source object store (step 1634). Next, the destination object store purges off deleted objects whose dirty bits are off (step 1636).

The source object store extracts objects whose dirty bits are on (step 1638). These objects, their IDs, and dirty bits are packed together and represented in an update type acceptable to the destination object store and passable through the syncFilter defined on the destination object store (step 1640). The source object store then sends a request sync message with these fields assigned to the specified values (step 1642): isRequest—true; isAskedForTotalNumberOfSyncUpdatesReceived—true; syncUpdates <extracted updates>; totalNumberOfSyncUpdates <number of extracted updates>; totalBytesOfSyncUpdates <size in byte of extracted updates after they are, if any encoded>; encodingMethod <encoding method, if any used to encode extracted updates>; isLastRequest—true. The destination object store applies each of the received updates to a corresponding object (step 1644), sets the dirty bits of the updated objects and the object store (step 1646), and sends a response sync message to the request sync message providing the number of updates that was received and successfully processed (step 1648). The source object store then resets the dirty bits associated with the first m updates sent, where m is the value of the totalNumberOfSyncUpdatesReceived field in the response sync message received from the destination object store (step 1650). Next, the source object store purges off deleted objects whose dirty bits are off (step 1652).

Figure 16A:
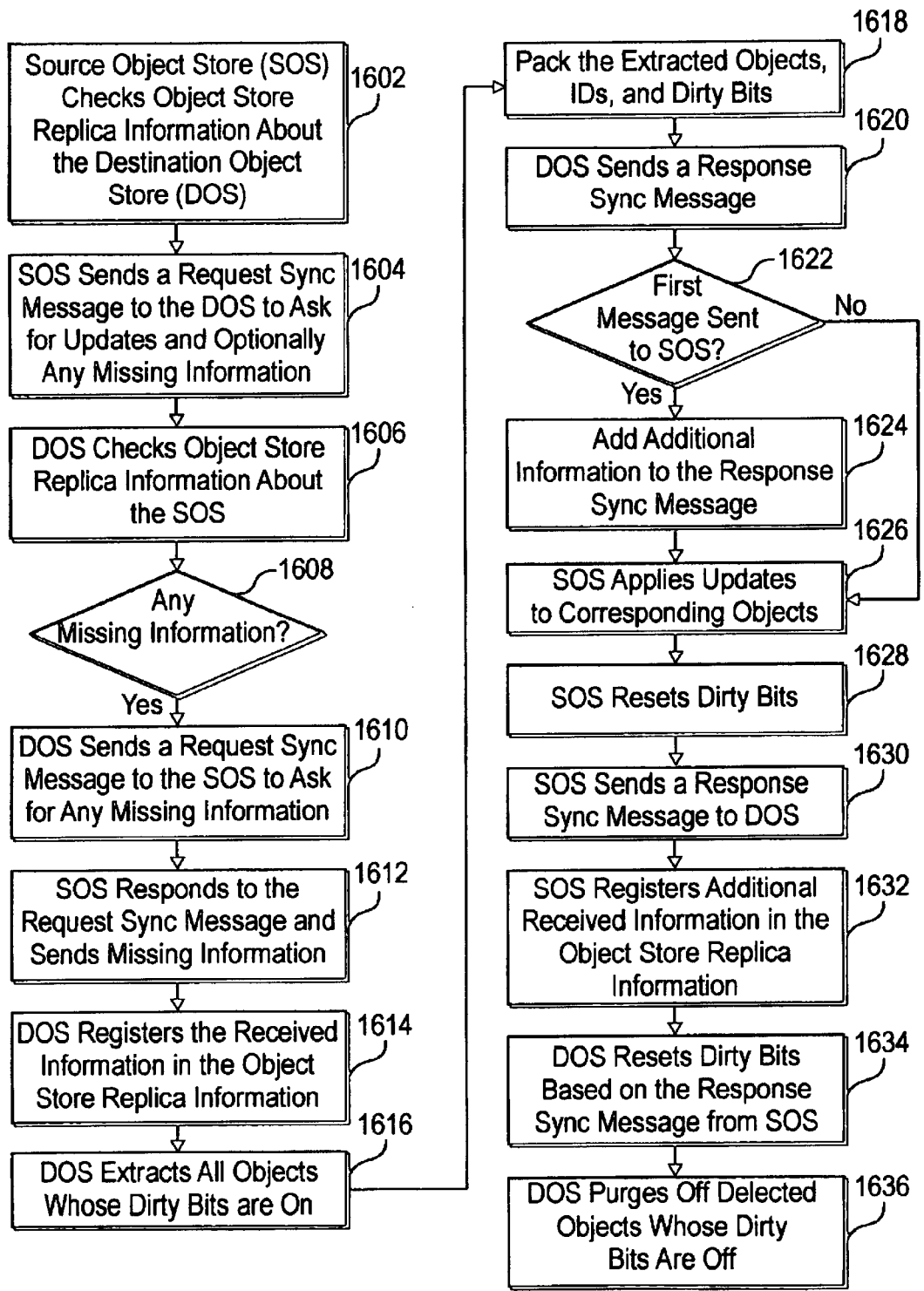
FIGS. 16A–B illustrate another exemplary process in accordance with an embodiment of the invention.
Figure 16B:
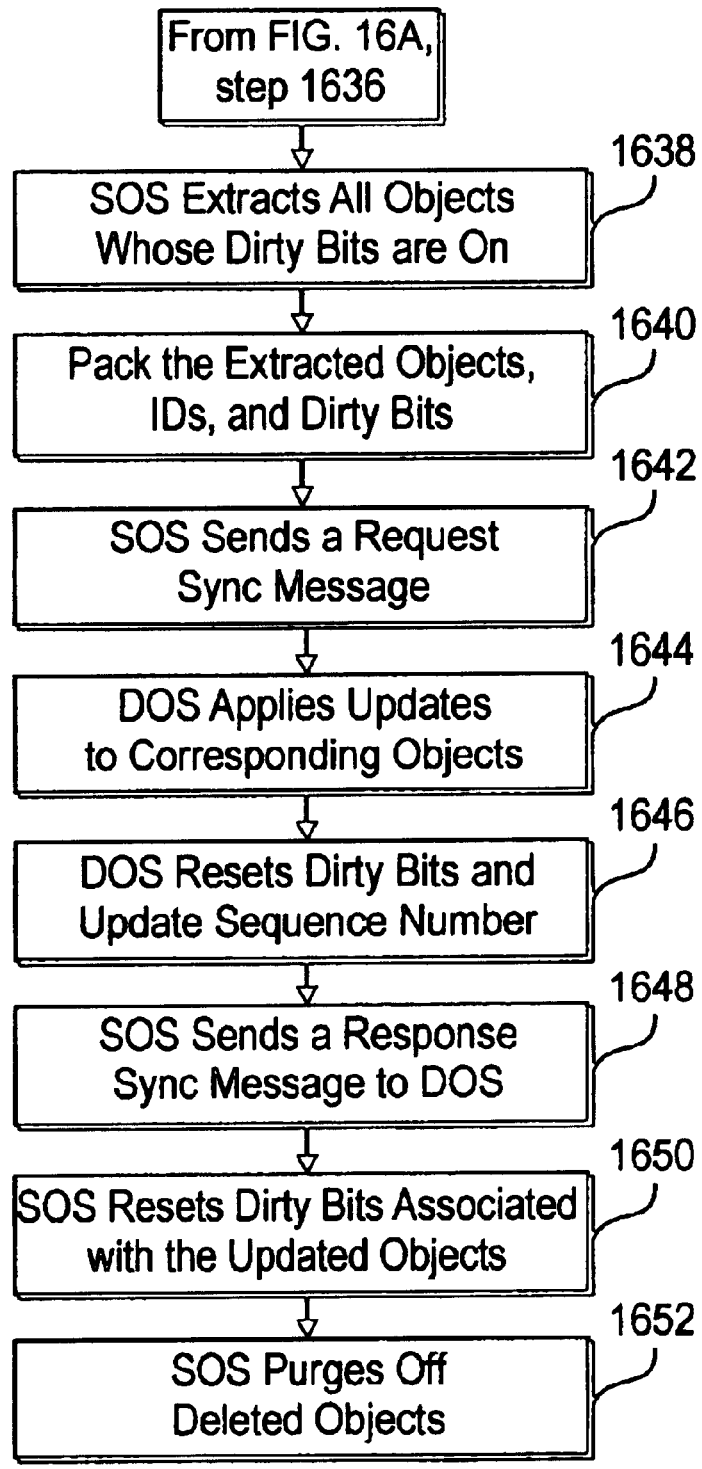

In general, the process described in FIGS. 16A–B is the reverse of the process described above in FIGS. 12A–B. An exemplary sync message flow for pull-then-push, client-to-server synchronization in a client-server system is generally the reverse of the exemplary processes described above in FIGS. 13A–B. Similarly, an exemplary sync message flow for pull-then-push, server-to-client synchronization in a client-server system is generally the reverse of the exemplary processes described above in FIGS. 14A–B. Yet another exemplary sync message flow for pull-then-push synchronization in a peer-to-peer system is generally the reverse of the exemplary processes described above in FIGS. 15A–B.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

APPENDIX A

In an exemplary embodiment, a sync version message comprises on or more of the following fields:

1. isRequest—indicates whether a SyncMessage is a request message or a response message.
2. messageid—a unique id of a SyncMessage. The message id is unique among request messages. Generally, a response message has the same message id as the request message it responds to.
3. clientURL—the initiating ObjectStore URL. This field is used by a request message originating from an initiating ObjectStore. It specifies in the first request message from an initiating ObjectStore to a responding ObjectStore in a data synchronization process.
4. serverURL—the responding ObjectStore URL. This field is used by a request message originating from an initiating ObjectStore. It specifies in the first request message from an initiating ObjectStore to a responding ObjectStore in a data synchronization process.
5. generateUpdateTypes—the update types which the ObjectStore originating the message can produce. An update usually contains an application object along with the meta objects associated with it.
6. applyUpdateTypes—the update types which the ObjectStore originating the message can accept.
7. storeInterfaces—the type of the ObjectStore originating the message.
8. storesyncVersionType—the type of the SyncVersion associated with the ObjectStore originating the message.
9. objectSyncVersionType—the type of SyncVersion associated with individual objects in the ObjectStore originating the message.
10. syncFilter—the subset filter that defines the set of application objects acceptable to the ObjectStore originating the message.
11. usableEncodingMethods—the standard data encoding (encrypting or compressing) methods which the ObjectStore originating the message supports.
12. dataEncodingMethod—the standard data encoding (encrypting or compressing) method which the ObjectStore originating the message used to encode the update data enclosed in the message.
13. userName—the user name of the initiating ObjectStore. This field is used by a response message origination from an initiating ObjectStore.
14. password—the user password of the initiating ObjectStore. This field is used by a response message origination from an initiating ObjectStore.
15. TotalNumberOfSyncUpdatesSent—the total number of updates enclosed in the message.
16. totalNumberOfSyncUpdatesReceived—the total number of updates received by the ObjectStore originating the message in the last message from the remote ObjectStore.
17. totalBytesOfSyncUpdatesSent—the total size in byte of the update data enclosed in the message.
18. toealBytesOfSyncUpdatesReceived—the total size in byte of the update data received by the ObjectStore originating the message in the last message from the remote ObjectStore before the update data is decoded.
19. syncUpdates—the update data in order. Each update contains an object and its associated meta objects to be compared and merged with its replica object in the ObjectStore receiving the message.
20. store Version—the SyncVersion of the ObjectStore originating the message.
21. statusCode—the status code indicating whether the ObjectStore originating the message succeeded or failed to respond to a request message. This field is used by a response message.
22. statusDescription—the human-readable description for a succeeded or failed request processing. This field is used only for a response message.
23. isAskedForGenerateUpdateTypes—the flag that indicates whether the ObjectStore originating the message is asking the ObjectStore receiving the message to send the update types it can produce. This field is used by a request message.
24. isAskedForApplyUpdateTypes—the flag that indicates whether the ObjectStore originating the message is asking the ObjectStore receiving the message to send update types it can accept. This field is used by a request message.

25. isAskedForStoreInterfaces—the flag that indicates whether the ObjectStore originating the message is asking the ObjectStore receiving the message to send its ObjectStore type. This field is used by a request message.

26. isAskedForUserNarneAndPassword—the flag that indicates whether the ObjectStore originating the message is asking the ObjectStore receiving the message to send its user name and password for authentication. This field is used by a request message originating from a responding ObjectStore.

27. isAskedForTotalNumberOfSyncUpdatesSent—the flag that indicates whether the ObjectStore originating the message is asking the ObjectStore receiving the message to send the total number of updates it can send. This field is used by a request message.

28. isAskedForTotalNumberOfSyncUpdatesReceived—the flag that indicates whether the ObjectStore originating the message is asking the ObjectStore receiving the message to send the total number of updates it received from the message.

29. isAskedForTotalBytesOfSyncUpdatesSent—the flag that indicates whether the ObjectStore originating the message is asking the ObjectStore receiving the message to send the total size in byte of the it can send. This field is used by a request message.

30. isAskedForTotalBytesOfSyncUpdatesReceived—the flag that indicates whether the ObjectStore originating the message is asking the ObjectStore receiving the message to send the total size in byte of the updates it received from the message.

31. isAskeForSyncUpdates—the flag that indicates whether the ObjectStore originating the message is asking the ObjectStore receiving the message to send the updates it can produce. This field is used by a request message originating from an initiating ObjectStore.

32. isAskedEorStore Version—the flag that indicates whether the ObjectStore originating the message is asking the ObjectStore receiving the message to send the Sync Version associated with it.

33. isAskedForSyncFilter—the flag that indicates whether the ObjectStore originating the message is asking the ObjectStore receiving the message to send the subset filter defined on it.

34. isLastRequest—the flag that indicates whether the message will be the last request from the initiating ObjectStore. This field is used by a request message originating from an initiating ObjectStore.

35. hasMoreSyncUpdates—the flag that indicates whether the ObjectStore originating the message has more updates to send. This field is used by a response message.

What is claimed is:

1. A method for facilitating data synchronization, comprising the steps of:
   (a) obtaining a list of encoding methods from a remote object store;
   (b) extracting a first set of objects to be synchronized with said remote object store;
   (c) packing said first set of objects, their associated identifiers and synchronization versions into a request synchronization message;
   (d) sending said request synchronization message to said remote object store;
   (e) receiving a response synchronization message from said remote object store, said response synchronization message indicating a number of updated objects at the remote object store; and
   (f) resetting a corresponding set of synchronization versions to said updated objects.

2. The method of claim 1, further comprising the steps of:
   (1) checking object store replica information corresponding to said remote object store;
   (2) sending a request message to said remote object store if any information is missing from said object store replica information;
   (3) receiving a response from said remote object store; and
   (4) registering said response in said object store replica information.

3. The method of claim 1, further comprising the steps of:
   (1) updating objects based on said request synchronization message at said remote object store; and
   (2) sending a response synchronization message providing a number of objects received and processed.

4. The method of claim 1, further comprising the step of:
   adding a field in said request synchronization message indicating whether said request synchronization message is a last request to said remote object store.

5. A computer program product for facilitating data synchronization, comprising:
   (a) logic code for obtaining a list of encoding methods from a remote object store;
   (b) logic code for extracting a first set of objects to be synchronized with said remote object store;
   (c) logic code for packing said first set of objects, their associated identifiers and synchronization versions into a request synchronization message;
   (d) logic code for sending said request synchronization message to said remote object store;
   (e) logic code for receiving a response synchronization message from said remote object store, said response synchronization message indicating a number of updated objects at the remote object store; and
   (f) logic code for resetting a corresponding set of synchronization versions to said updated objects.

6. The computer program product of claim 5, further comprising:
   (1) logic code for checking object store replica information corresponding to said remote object store;
   (2) logic code for sending a request message to said remote object store if any information is missing from said object store replica information;
   (3) logic code for receiving a response from said remote object store; and
   (4) logic code for registering said response in said abject store replica information.

7. The computer program product of claim 5, further comprising:
   (1) logic code for updating objects based on said request synchronization message at said remote object store; and
   (2) logic code for sending a response synchronization message providing a number of objects received and processed.

8. The computer program product of claim 5, further comprising:
   logic code for adding a field in said request synchronization message indicating whether said request synchronization message is a last request to said remote object store.

* * * * *